United States Patent [19]

Louth

[11] Patent Number: 4,635,138
[45] Date of Patent: Jan. 6, 1987

[54] MICROPROCESSOR CONTROLLED REPRODUCING APPARATUS HAVING ASYNCHRONOUS REPRODUCING CAPABILITY

[75] Inventor: Kenneth Louth, Los Altos, Calif.

[73] Assignee: Ampex Corporation, Redwood City, Calif.

[21] Appl. No.: 660,453

[22] Filed: Oct. 2, 1984

Related U.S. Application Data

[63] Continuation of Ser. No. 364,793, Apr. 2, 1982, abandoned.

[51] Int. Cl.⁴ ............................................. G11B 15/52
[52] U.S. Cl. ..................................... 360/10.3; 360/73
[58] Field of Search .................... 360/9.1, 10.1, 10.2, 360/10.3, 70, 73; 358/312, 337, 338, 339

[56] References Cited

U.S. PATENT DOCUMENTS

| | | | |
|---|---|---|---|
| 3,683,992 | 8/1972 | Farr | 358/312 |
| 4,296,446 | 10/1981 | Zorbalas | 360/73 |
| 4,302,784 | 11/1981 | Mussatt | 360/71 |
| 4,348,699 | 9/1982 | Tsuchiya et al. | 360/32 |
| 4,358,798 | 11/1982 | Hedlund et al. | 360/73 |

OTHER PUBLICATIONS

IEEE Transactions on Consumer Electronics, vol. CE-27, Feb. 1981, pp. 71–79, One Chip Servo System LSI for Home VCR, Kobori et al.

Primary Examiner—George G. Stellar
Attorney, Agent, or Firm—Bradley A. Perkins; Joel D. Talcott

[57] ABSTRACT

A microprocessor controlled multiple servo system for use with a recording and reproducing apparatus is disclosed. The system controls all servo systems for a magnetic tape recording and reproducing apparatus, including a capstan servo, a reel servo, a scanning drum servo and an automatic scan tracking servo which controls the position of reproduced heads carried by the scanning drum which are of the type which can be transversely moved relative to the longitudinal direction of recorded tracks to accurately follow the tracks during special effect reproducing modes, such as slow motion, stop motion and fast motion reproducing. The microprocessor controlled servo system has unique and powerful functional capabilities which enable it to provide reliable precise asynchronous reproducing so that precisely accurate time compression and expansion can be carried out without performing any editing of the recorded material.

7 Claims, 47 Drawing Figures

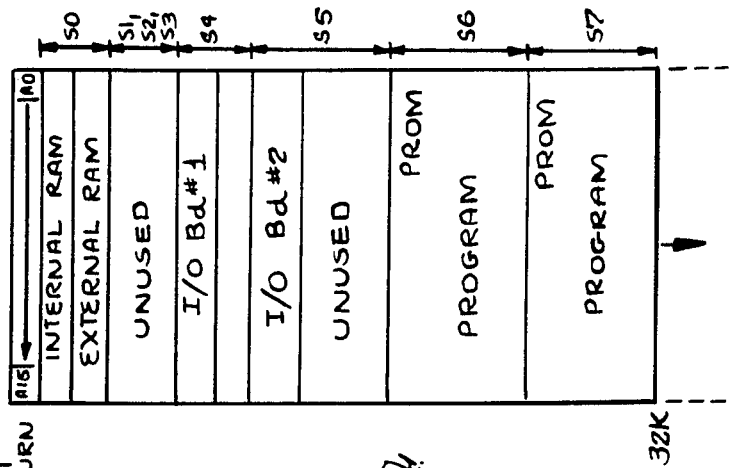
Fig. 4
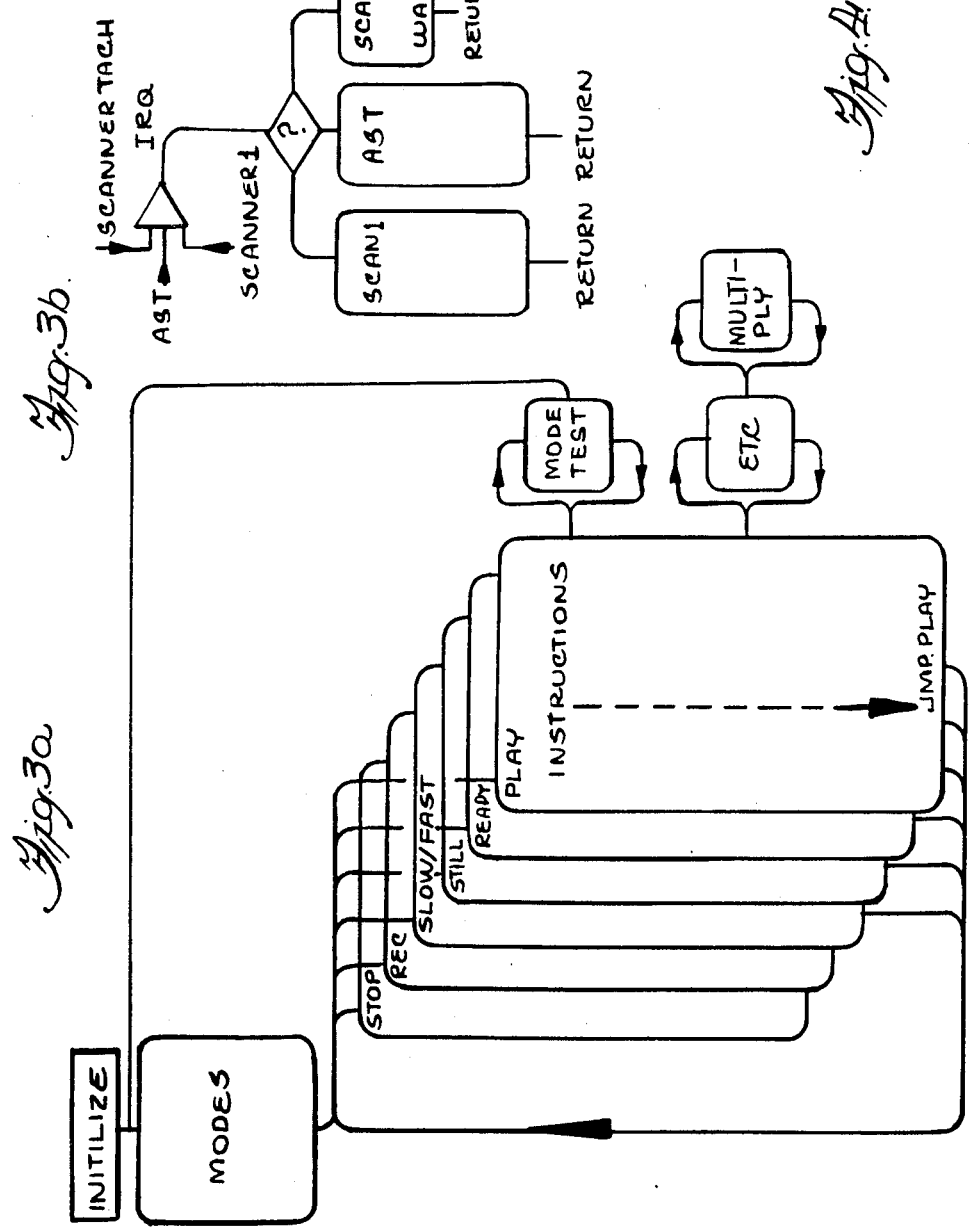
Fig. 3b
Fig. 3a

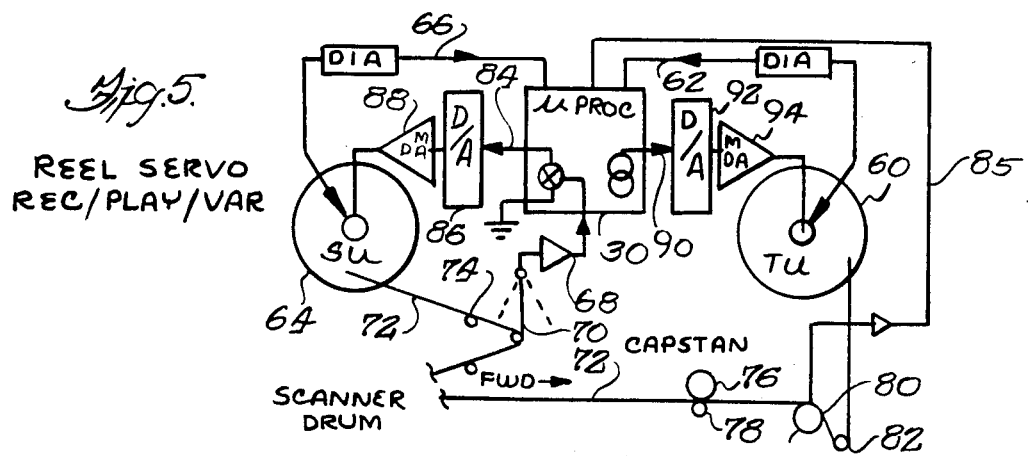
Fig. 5. REEL SERVO REC/PLAY/VAR
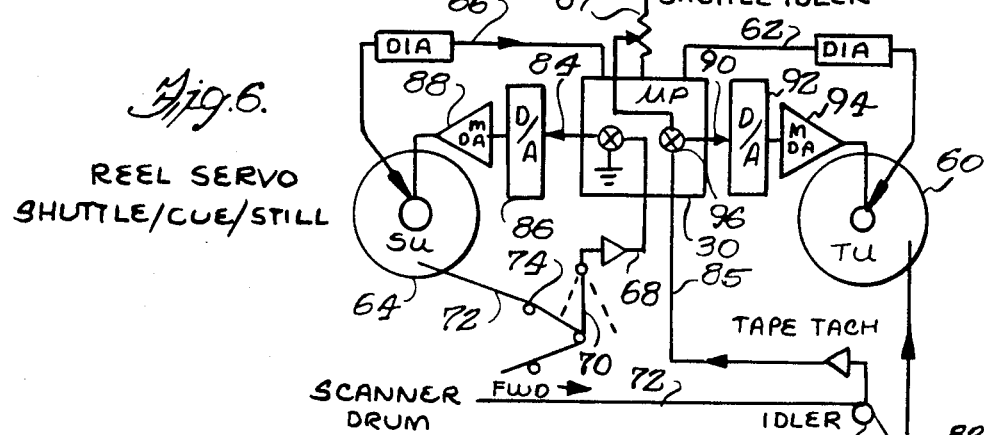
Fig. 6. REEL SERVO SHUTTLE/CUE/STILL
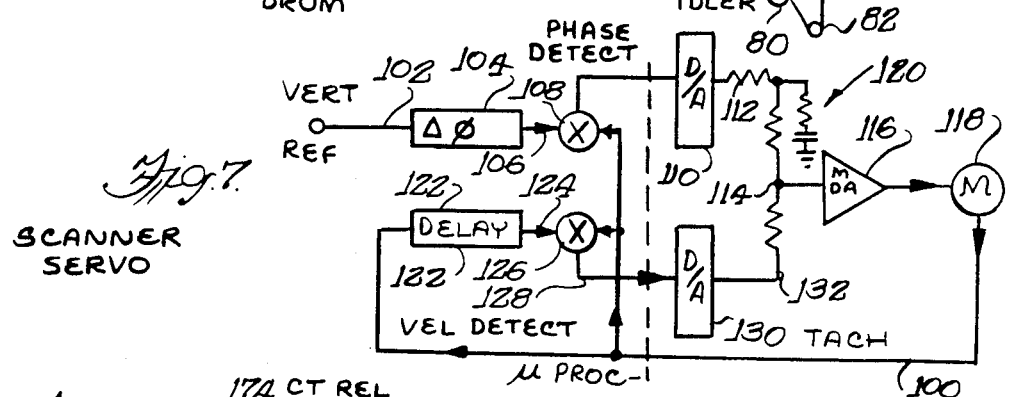
Fig. 7. SCANNER SERVO
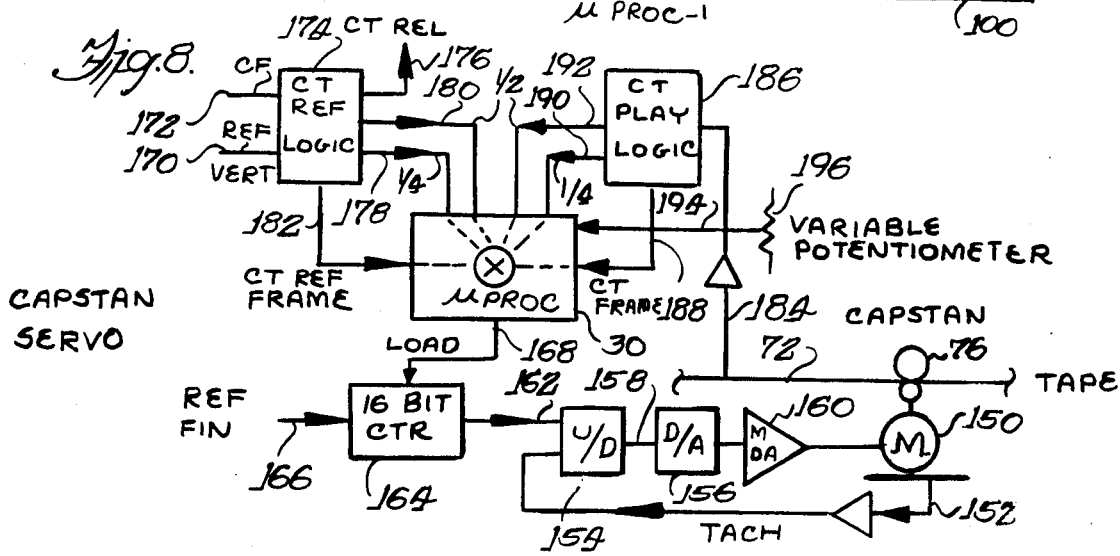
Fig. 8. CAPSTAN SERVO Fig. 9.
(1) TAPE TACH
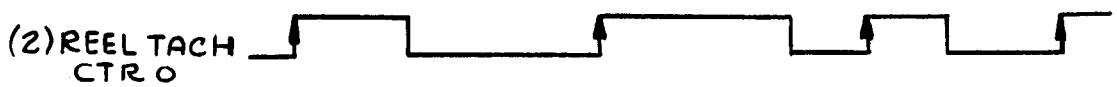
(2) REEL TACH CTR 0
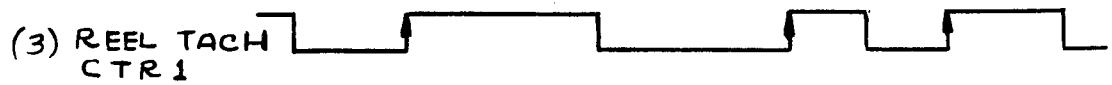
(3) REEL TACH CTR 1
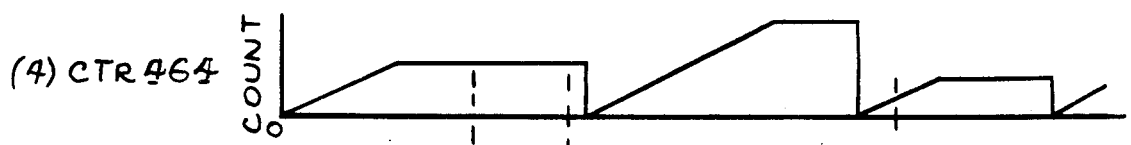
(4) CTR 464
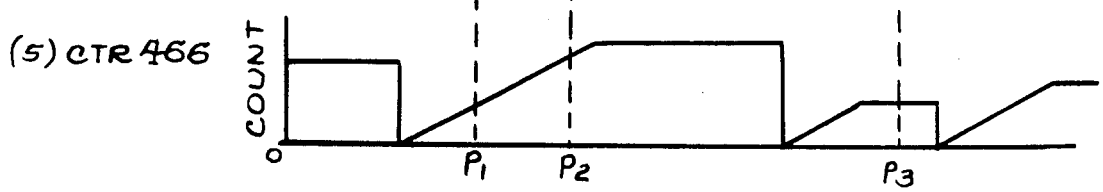
(5) CTR 466
$P_1$  $P_2$  $P_3$
Fig. 10.
(1) 2H CLOCK (LINE 520)
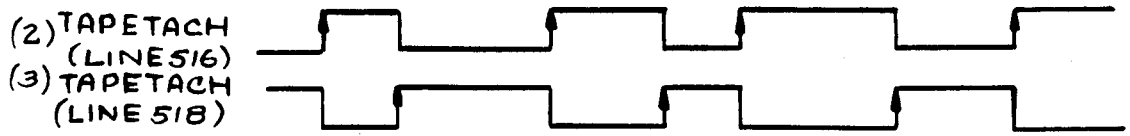
(2) TAPE TACH (LINE 516)
(3) TAPE TACH (LINE 518)
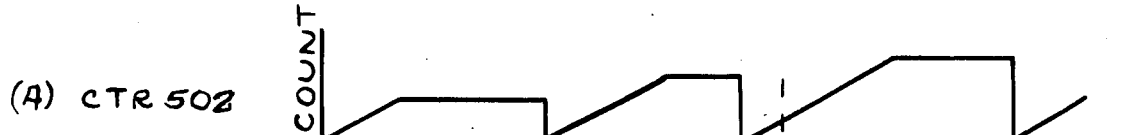
(4) CTR 502
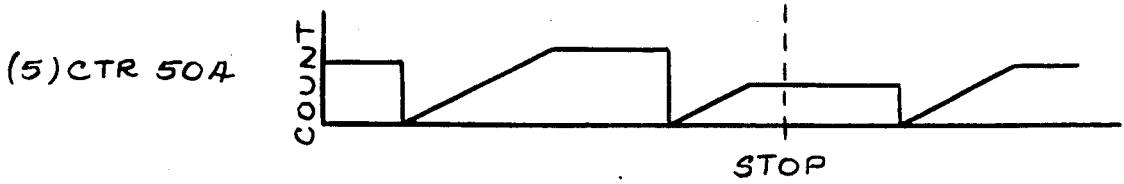
(5) CTR 504
STOP

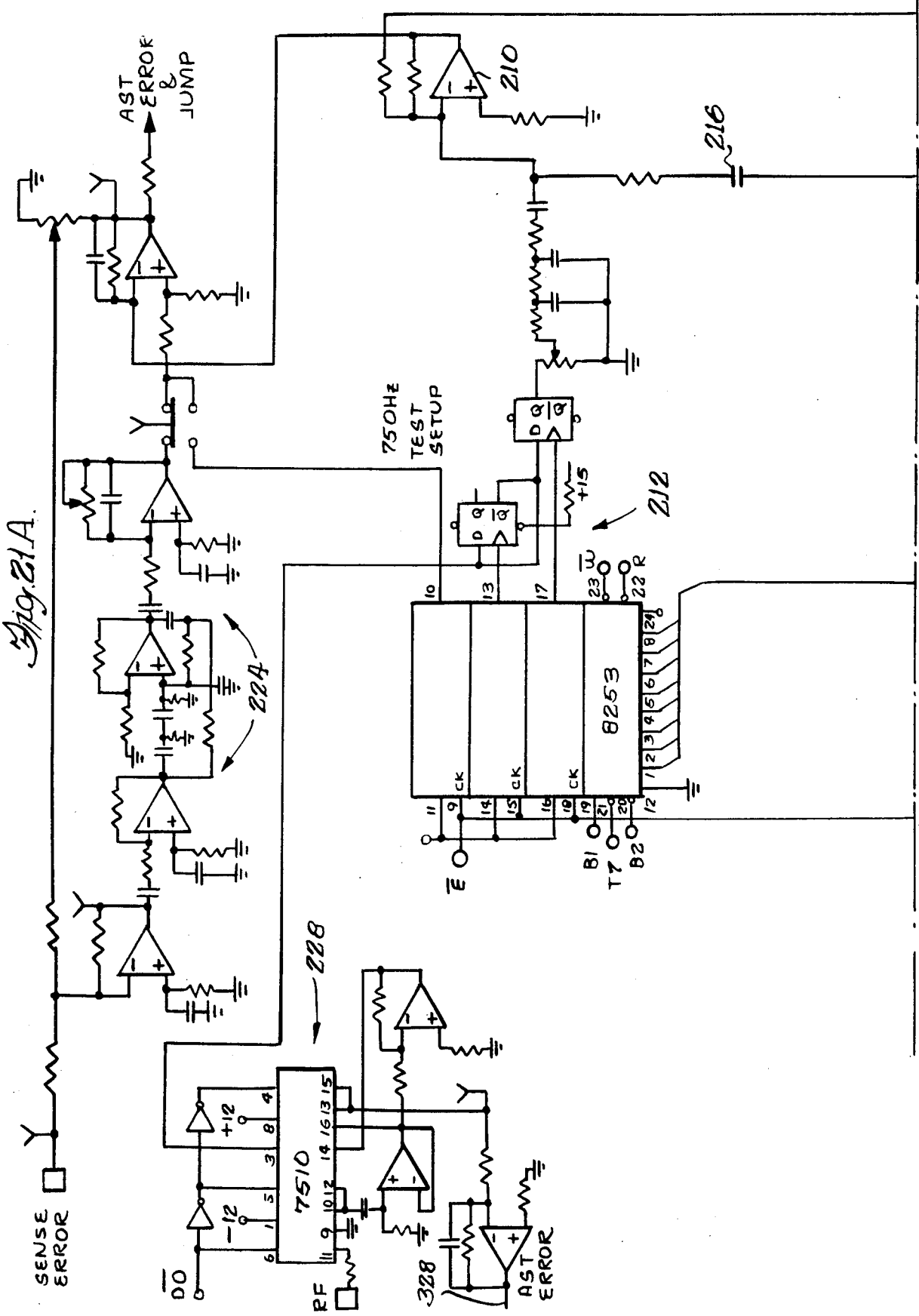

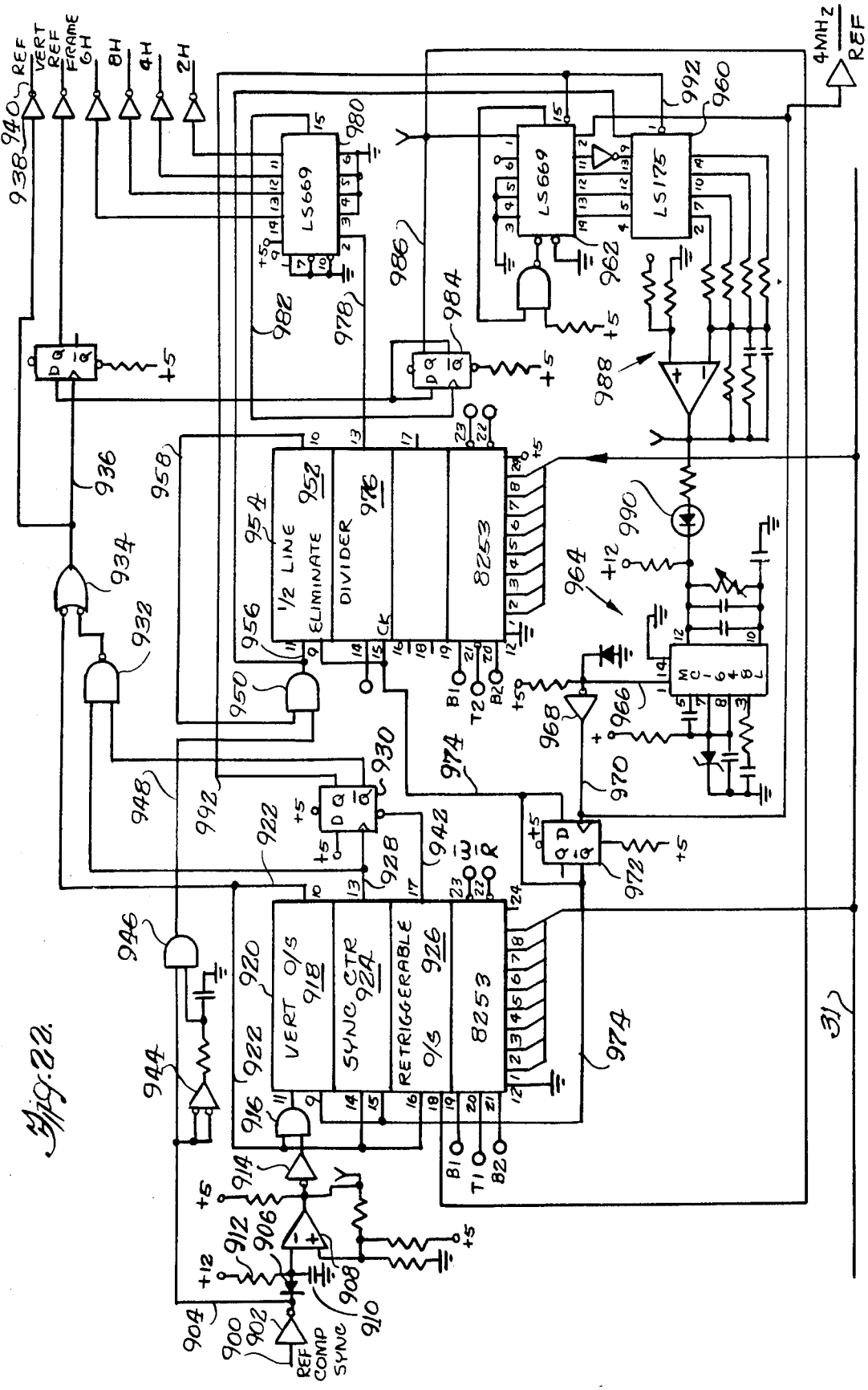

MICROPROCESSOR CONTROLLED REPRODUCING APPARATUS HAVING ASYNCHRONOUS REPRODUCING CAPABILITY

CROSS REFERENCE TO RELATED APPLICATIONS

This application is a continuation of application Ser. No. 364,793 filed Apr. 2, 1982, now abandoned.

MICROPROCESSOR CONTROLLED MULTIPLE SERVO SYSTEM FOR A RECORDING AND/OR REPRODUCING APPARATUS, Ser. No. 364,725, filed Apr. 2, 1982, by Kenneth Louth.

PHASE DETECTOR CONTROL FOR A SERVO SYSTEM, Ser. No. 707,161 filed Feb. 22, 1985 which is a continuation of Ser. No. 608,268 filed May 7, 1984 now abandon which is a continuation of Ser. No. 364,964, filed Apr. 2, 1982, by Kenneth Louth now abandoned.

AN IMPROVED REEL SERVO SYSTEM IN A RECORDING AND/OR REPRODUCING APPARATUS, Ser. No. 655,983 filed Sept. 27, 1984 which is a continuation of Ser. No. 364,652, filed Apr. 2, 1982, by Kenneth Louth now abandoned.

AN IMPROVED AUTOMATIC SCAN TRACKING SERVO SYSTEM, Ser. No. 364,961, filed Apr. 2, 1982, by Kenneth Louth.

A PROGRAMMABLE NONLINEAR SPEED CONTROL FOR A RECORDING AND/OR REPRODUCING APPARATUS, Ser. No. 647,260 filed Sept. 4, 1984 which is a continuation of Ser. No. 364,962, filed Apr. 2, 1982, by Kenneth Louth now abandoned.

AN IMPROVED SCANNING SERVO SYSTEM IN A RECORDING AND/OR REPRODUCING APPARATUS, Ser. No. 346,963, filed Apr. 2, 1982, by Kenneth Louth.

The present invention generally relates to servo systems for recording and reproducing apparatus and, more particularly, to a microprocessor controlled head servo system for a magnetic tape recording and reproducing apparatus that has asynchronous reproducing capability.

It is readily appreciated that video recording and reproducing apparatus, particularly, apparatus that records and reproduces video information of broadcast quality, is highly technical and complex equipment that requires sophisticated electronic as well as mechanical components and systems. For broadcast quality recording and reproducing apparatus, particularly video tape recording and reproducing apparatus, the level of technical sophistication is extraordinary in terms of the amount of control that is required to reliably operate the apparatus at broadcast quality standards. Such videotape recording apparatus have a number of servo systems which control their operation, including a servo system for controlling the rotation of the rotatable member recording and reproducing transducers or heads, the servo system which controls the reel drive motors which drive the supply and take-up reels and the capstan servo system which controls the speed with which the tape is driven during recording and reproducing.

Relatively recent developments in recording and reproducing apparatus include a servo system which controls a movable element carrying the reproducing head (or heads) on the scanning drum which movable element is controlled to have the reproducing head follow a track during reproducing thereof so as to permit broadcast quality reproducing during special motion effects, i.e., when the tape is being moved at a speed other than the speed with which it was moved during recording. The movable element moves the head in a direction that is transverse relative to the longitudinal direction of the track to enable it to accurately follow a recorded track and produce a quality signal regardless of whether the tape is being moved at a speed faster than normal record speed which results in a fast motion effect, or if it is moved at a slower than normal speed which results in a slow motion or even stop motion (still frame) effects. The considerations involved in such special motion reproducing effects are comprehensively set forth in the Hathaway et al. Ser. No. 576,623 filed Feb. 3, 1984 which is a continuation of Ser. No. 677,815, filed Apr. 16, 1977, now abandoned which is a continuation of Ser. No. 668,652 filed Mar. 19, 1976 now abandoned.

Servo systems for controlling the various motors have generally been relatively independent of one another in prior art systems. In other words, the servo system for the reels and the capstan, while controlled by an operator through conventional control switches and the like tended to operate independently of one another to accomplish the desired function and there was very little actual interaction between one servo system and another, except through such overall control. While such servo systems in the past may have operated under the control of separate microprocessors, each of the servo system essentially was made to perform the same functions as had been previously done.

The operations that are independently performed by the various prior art servos are not easily altered to accomplish special functions. It has also been difficult to have a single recording and reproducing apparatus operate to record video signals of a NTSC signal format or a PAL signal format. Most prior art systems have not been particularly adaptable to provide special functional operations. One very desirable feature that has not been available in prior art video tape recording and reproducing apparatus is the capability of providing true asynchronous reproduction so that time expansion or compression of a program can be accomplished. If asynchronous reproducing can be done, it is highly desirable to have the recording and reproducing apparatus be control track locked. If the tape is being moved at a speed other than normal tape transport speed, then there will be a slight degree of mistracking which means that the automatic scan servo system is virtually a requirement for providing broadcast quality reproduction. Additionally, it is highly desirable, if not essential, to eliminate the time variations that are inherent in interchanging a recording made by one apparatus with that made from another. Even though an asynchronous playback apparatus maybe altered to provide a definite predicted time expansion or compression, the interchange timing variation may be of such magnitude that it would be greater than the degree of time compression or expansion that would otherwise occur if no interchange caused timing errors existed.

Accordingly, it is an object of the present invention to provide an improved servo system for use of a recording and reproducing apparatus which reliably accomplishes accurate and effective asynchronous playback.

Yet another object of the present invention is to provide an improved servo system of the foregoing type which permits an operator to virtually dial in a precise time compression or expansion for a particular length program, which servo system also eliminates any timing variation that may be present due to an interchange created timing error.

Other objects and advantages will become apparent upon reading the following detailed description, while referring to the attached drawings.

DESCRIPTION OF THE DRAWINGS

FIGS. 3a and 3b are very broad flow charts illustrating the software functional operation of the microprocessor;

FIG. 4 is a map illustrating the manner in which the software instructions are located within the associated microprocessor memories;

FIG. 5 is a functional block diagram of the reel servo system during operation in the record, play and variable speed reproduce modes wherein the capstan is engaged;

FIG. 6 is a functional block diagram of the reel servo system as operated in the shuttle mode, during cueing and during still frame reproducing mode wherein the capstan is not engaged;

FIG. 7 is a functional block diagram of the scanner servo system;

FIG. 8 is a functional block diagram of the capstan servo system;

FIGS. 9 and 10 are timing diagrams that are useful in illustrating the operation of the reel servo system;

FIG. 15 is a functional block diagram illustrating the automatic scan tracking servo system embodying the present invention and particularly illustrating the error correcting portion of the automatic scan tracking servo system shown in FIG. 11;

FIG. 21a and 21b together comprise a detailed electrical schematic circuit diagram of circuitry which carries out the automatic scan tracking servo system damping, synchronous detection and ramp generating functions, which circuitry carries out the operation as shown in the block diagram of FIGS. 11, 14 and 15;

FIG. 22 is a detailed electrical schematic diagram of a reference generator circuitry of the apparatus embodying the present invention;

DESCRIPTION OF THE APPARATUS

Broadly stated, the servo system includes a microprocessor which effectively controls the major servo systems of a tape recording and reproducing apparatus, which servo system includes: (1) a scanning head servo which rotates the recording and reproducing heads at the proper speed during operations; (2) a capstan servo which controls the movement of the tape during recording and during most, but not all reproducing operations; (3) the automatic scan tracking servo which controls transverse movement relative to the longitudinal direction of the track of the reproduce head to have it accurately follow a track during reproducing and particularly during reproducing for special motion effects wherein the tape is being transported at a speed other than normal playback speed; and, (4) the reel servos which control the tensioning of the tape during recording and reproducing operations and the movement of the tape during a shuttle operation. The microprocessor receives digital information as well as digitally converted analog information from various locations throughout the circuitry and apparatus, processes such information and thereafter provides digital output signals to other circuitry, some signals of which are converted into the analog domain for controlling the various operations that are performed by the apparatus in its various modes.

Figure 1:
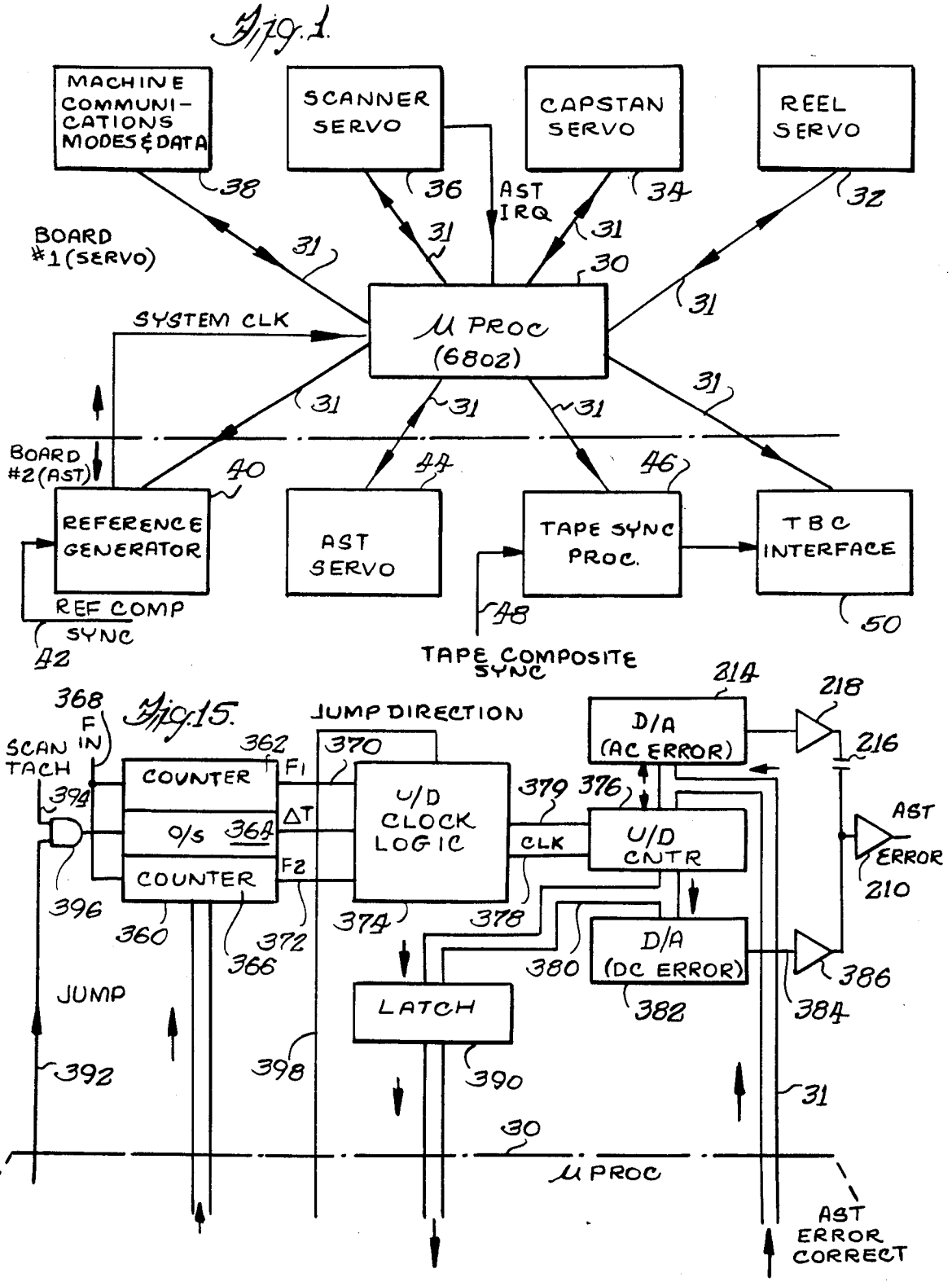
FIG. 1 is a functional block diagram illustrating the functional interaction of the microprocessor with the various servo systems of the apparatus, and of the microprocessor and other important circuitry.

Turning initially to the block diagram of FIG. 1, there is shown a microprocessor 20 which is interconnected by a data bus 31 with a reel servo 32, a capstan servo 34, a head scanner servo 36 and a machine communication interface and data 38 which essentially controls the various operating modes of the recording and reproducing apparatus as manipulated by an operator either directly or from a remote location. The microprocessor also interacts with a reference generator 40 which receives as an input thereto a reference station composite sync signal via line 42 and reference generator generates system clocks that control the microprocessor, which in turn synchronizes all of the clock timing of the servos and other circuitry. The microprocessor also interacts with the automatic scan tracking servo 44 and a tape sync processor 46 which has a tape composite sync signal input via line 48. The tape sync processor additionally provides a signal to the time base corrector interface 50 which provides appropriate timing and control signals for use by the time base corrector to provide a broadcast quality video image having the requisite stability and vertical display position with respect to system reference as well as the correct chroma information, which processing varies depending upon what reproducing mode the apparatus is being operated.

Figure 2:
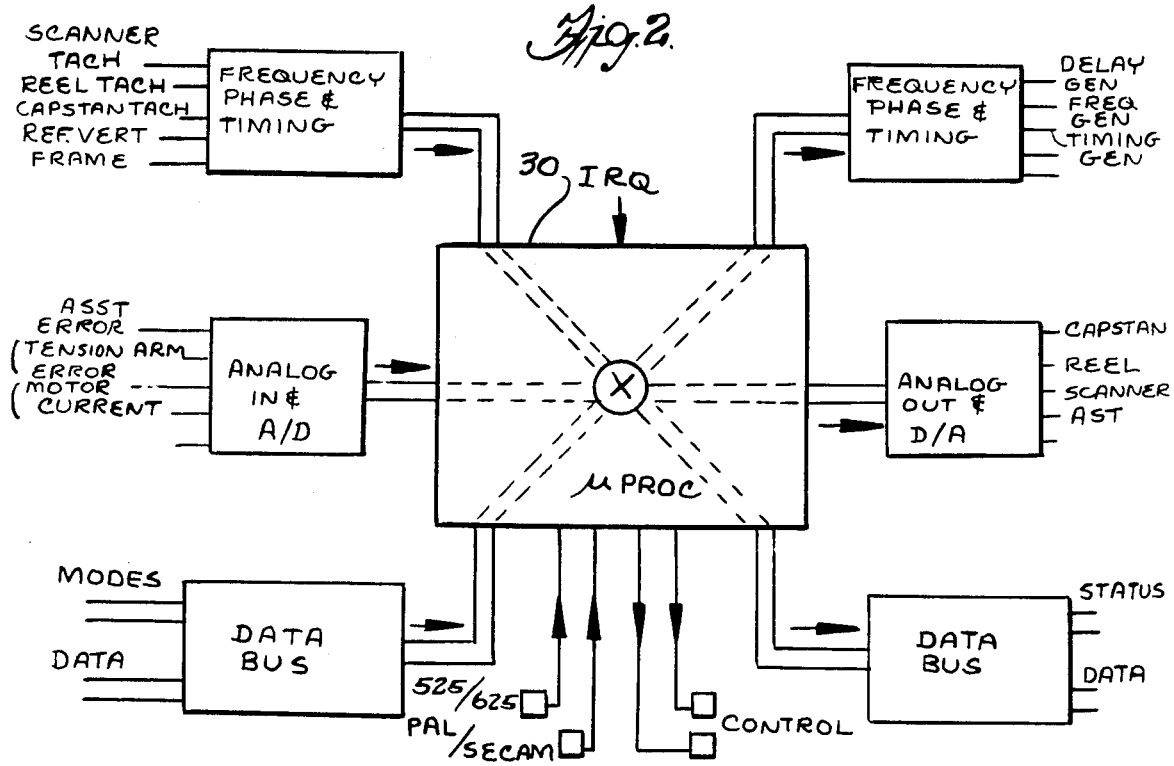
FIG. 2 is another functional block diagram of the microprocessor and illustrates the manner in which it receives input information relating to the operation of the apparatus and provides output signals that are used to control the operation of the apparatus.

While the functional block diagrams shown in FIG. 1 illustrate the interaction of the microprocessor with the various servo systems of the apparatus, with machine control and with the time base corrector and the like, the system can also be functionally described in terms of input and output signals that are provided to and from the microprocessor and this functional block diagram is shown in FIG. 2. The microprocessor 30 receives frequency, phase and timing data shown by the upper left functional block including such input signals as head scanner tach pulses, reel tach pulses, capstan tach pulses, reference vertical and frame timing signals, which are converted into digital information for processing by the microprocessor. The microprocessor also receives analog information shown by the block left of the microprocessor which is converted into digital information for processing by the microprocessor and such analog input signals include the automatic scan tracking error signals, the tension arm error signals and various signals related to motor currents of the reel drive motors, the capstan drive motor and the head scanner drive motor. The data bus also receives operating mode information as well as other machine control data and it processes this information and provides status information and other data. The microprocessor generates digital information which is converted to analog information and these analog output signals include control signals for the capstan servo, the reel servo, the head scanner servo and the automatic scan tracking servo. Similarly, the microprocessor provides frequency, phase and timing output information which include delay signals, phase and timing output information that are used by the various servos and other circuits of the apparatus.

The microprocessor controlled system of the present invention has a unique advantage in that it is adaptable for recording and reproducing video signals from any standard worldwide format, i.e., it can record and reproduce a NTSC signal having 525 lines or a PAL or SECAM signal having 625 horizontal lines. The input control line can be set to operate either as a 525 or 625 line system and the various constants and other software values which control the servos and other circuitry of the apparatus will be selected for proper operation. Similarly, another control line can be set for either a PAL or SECAM format system once a 625 line system is specified. The software in memory includes instructions and numerical constants that will permit the apparatus to properly operate regardless of the television signal format that is selected.

In accordance with an aspect of the present invention, the microprocessor controlled servo system described herein is adapted to control the reel servo system and the head scanner servo system during the high speed shuttle mode in a way so as to protect the recording and reproducing heads, while the tape is being wound off one of the reels onto the other. In the past, as the tape was nearing the end so as to be wound on a single reel during high speed shuttle, the potential for chipping the ceramic recording and reproducing heads was quite high. In accordance with an aspect of the apparatus described herein, during high speed shuttle, reel tape pack diameter information that is determined by the microprocessor is used to control the reel servo and the scanning head servo to perform a sequence of events which substantially reduce if not eliminate the possibility of heads being chipped. When the microprocessor determines that the tape has almost reached the end of being wound off of one reel, it controls the reel servo to stop the tape and it also reverses the head scanner motor current to brake the rotation of the heads. After the tape has been stopped, the reel servo moves the tape at a relatively slow rate, e.g., twice normal recording speed, and the rotating head assembly is allowed to coast while the tape is wound entirely off of one reel on to the other.

The apparatus is programmed to operate in various operating modes as is shown in the broad flow chart of FIG. 3a. The flow chart representing microprocessor software shows that once the machine is initialized, a mode is selected and these modes include stop, record, slow and fast motion reproduce, stop motion or still frame reproduce, ready and normal play. Once the apparatus is placed in an operating mode, then it undergoes a mode test to determine if it is a valid mode and if such is the case, it will return to that mode and begin running the program that controls the appartus in that mode. If the mode test is invalid, then it will return to the stop mode and the apparatus will stop. After the apparatus is placed in a valid mode, it will continue in that mode until some event occurs, such as a mode change or a completion of some operation. Included as part of each operating mode are various subroutines which are called as shown in FIG. 3a. Certain ones of these subroutines are used in various ones of the operating modes. For example, the play mode will contain a block of code instructions that will call up various subroutines in the specified order. As long as the apparatus is operating in the play mode it will repetitively go through this block of code instructions. When the head scanner tachometer pulse occurs, it will cause an interrupt to the microprocessor as shown in FIG. 3b.

The microprocessor operates on an interrupt basis, with an interrupt resulting from one of three inputs. The software determines which input caused the interrupt and the microprocessor then enters the appropriate block of code which runs through various subroutines until it reaches the end and then returns to the instruction that had previously been completed prior to the interrupt. The scanner tachometer pulse originally triggered a counter which has a count that exceeds the maximum time required to store all current relevant information in stack registers in the microprocessor.

When this is done, it is ready to immediately perform the instructions in the scanner 1 block of code. This is carried out by the scanner interrupt block of code which causes the microprocessor to store the information and the literally wait for the scanner 1 interrupt. After the scanner 1 block of code is run, the microprocessor removes the information from the stack registers and resumes running through the instructions specified by the operating mode.

Complete software for operating the microprocessor for controlling all of the servos and other operations shown in the block diagrams of FIGS. 1, 2, 3a and 3b is contained in the computer code listings attached hereto as Appendix A. The program is written in a clear and concise manner to minimize the amount of memory that is required to perform the various operations. In this regard, FIG. 4 illustrates a memory map having 32,000 memory locations. As is shown in FIG. 1, the entire circuitry for the various servos and other operations are contained in two printed circuit boards with the upper first board containing most servos and the microprocessor itself and the second board containing the automatic scan tracking servo, reference generator, tape sync processor and time base corrector interface circuitry. In the memory map shown in FIG. 4, the program is written to utilize various portions of the 32K memory and the memory is segregated into eight separate 4K sections 50 through 57, which are decoded by address bits 12 through 14 which are used to place memory instructions in certain areas of the memory. For example, the address area $S_4$ is used to identify the input/output circuitry of the first board and area $S_5$ identifies a 4K section of memory wherein instructions relating to the operation of input/output portion of the second board are contained. Sections $S_1$, $S_2$ and $S_3$ are shown to be decoded but are not used during operation of the apparatus. Thus, from the illustration of FIG. 4 it should be appreciated that the entire operation of all of the servos and other operations shown in the block diagram of FIGS. 1 and 2 are carried out utilizing less than 4K of program. The operation of the head scanners servo system will now be broadly described on a functional level, followed by a more detailed description of the servo as well as other portions of the microprocessor controlled system.

Broad Reel Servo Description

In accordance with an important aspect of the present invention, the reel servo system will now be described in conjunction with two functional block diagrams shown in FIGS. 5 and 6. The upper block diagram shown in FIG. 5 illustrates the reel servo system in its capstan engaged mode whereas the block diagram of FIG. 6 illustrates the reel servo in its capstan nonengaged mode. The capstan is engaged in the modes of record, normal play and variable speed reproducing, except still frame reproducing, and is not engaged in shuttle, cue and still frame reproducing.

While the block diagram of FIGS. 5 and 6 are relatively self-explanatory, the components thereof include the microprocessor 30 which receives input information such as tachometer pulses from the take-up reel 60 via line 62, tachometer pulses from the supply reel 64 via line 66 and input information via line 68 relating to the position of a tensioning arm 70 around which tape 72 is wrapped. Thus, the tape from the supply reel passes over a guide 74 and the tensioning arm 70 about the helical wrap scanning drum (not shown), past the capstan 76 which engages the tape in cooperation with a pinch roller 78 on the opposite side of the tape. The tape is then wound around an idler 80, another guide 82 and onto the take-up reel 60. The microprocessor 30 receives the tachometer input information which enables it to compute the diameter of tape pack wrapped on the supply and take-up reels, and it also receives signals that indicate the position of the tension arm 70. The microprocessor provides output signals via line 84 to a digital-to-analog converter 86 which provides an analog signal which controls a motor drive amplifier 88 that in turn controls the supply reel drive motor. In a similar manner, the microprocessor controls the take-up reel via output line 90, digital-to-analog converter 92, and motor drive amplifier 94 for driving the take-up reel motor. As is shown in FIGS. 5 and 6, the idler 80 has a tachometer which provides a tape tach signal on line 85 indicating the tape speed and is applied to the microprocessor 30. A potentiometer 87 (FIG. G) that is controllable by an operator also provides an input signal to the microprocessor relating to the speed of the tape during shuttling which is controlled by an operator.

When the reel servo is in a capstan engaged mode as shown in FIG. 5, and the take-up reel 60 is receiving tape, the torque on the tape is controlled as a function of the size of the tape pack wrapped on the reel (the reel size) and it is controlled so that the capstan drive motor will perform a known and precise amount of work. In other words, when it is operating in the capstan engaged mode, the tension on the tape will be controlled so that the capstan drive motor is doing a precise amount of work. This will prevent the capstan drive motor from operating in a cross-over area of the motor drive amplifier. In this mode, the supply reel is controlled by a position servo loop having as its components the tension arm, the microprocessor, the digital-to-analog converter and the motor drive amplifier. During this mode, the microprocessor generates the error information, the reel tape pack diameter information, the reel speed information, the tape speed information and utilizes this information to provide the digital output signals to the digital-to-analog converter to properly control the motor drive amplifier. The microprocessor measures the tape pack diameter by calculating the same utilizing tachometer pulses from the reel tachometers together with tape speed information from the idler tachometer.

When the reel servo is operating in the capstan non-engaged modes during forward or reverse shuttle as well as cue and in the still frame reproducing mode, the block diagram of FIG. 6 illustrates the manner in which the reel servo operates. When the reel servo is operating in the forward or reverse shuttle or cue modes, the take reel up 60 is controlled in a velocity servo loop mode. The velocity servo loop uses the tape tachometer pulses from the idler tachometer which are indicative of the tape speed and compares them to a reference which is derived from an 8-bit number that is determined by the setting of the shuttle potentiometer control 87 in FIG. 6. As shown therein, the tape tachometer signal is applied to a comparator 96, the other input of which is supplied by the reference and provides a digital signal to the digital-to-analog converter 92 for controlling the motor drive amplifier 94 to operate the take up reel drive motor. In this manner, the take up reel will supply tape 72 at the speed determined by the operator, such as 150 or 300 i.p.s., for example.

The use of the velocity servo loop enables accurate control of the transport at low speeds, without the use of the capstan 76 which, as previously mentioned, is not engaged during shuttle, cueing and still frame reproducing. When the tape is being shuttled in either direction, take up reel operation is controlled by a velocity servo loop and the supply reel operation is controlled by a position servo loop in the same manner as described with respect to FIG. 5. When the tape is being shuttled in the forward direction, the tension arm reference is moved to the right which actually decreases the tension in the tape, such that the take up reel will pack or wind tape thereon with a nominal predetermined tension. When the tape is being shuttled in the reverse direction, the tension arm is moved to the left to increase the tape tension. This has the effect of overcoming friction of the transport and results in tape being wound onto the supply reel with a nominal predetermined tension. In this manner, the frictional load is maintained in the velocity loop and the supply reel is controlled as a function of the tension in the tension arm. It should be appreciated that while the dynamic characteristics in the forward direction are quite different from the dynamic characteristics in the reverse direction, the switching of the position loop tension arm reference from side to side causes the dynamic characteristics of forward and reverse to be comparable to one another.

A potential problem is produced if the tape is moved in the reverse direction. This can be appreciated by the example of the take-up reel feeding tape into the tension arm and wherein a significant amount of friction is present so that the tape sticks in the transport and is not supplied to the tension arm. Stated in other words, if the take-up reel pushes tape toward the idler fast enough to put slack in the tape (sometimes referred to as "throwing a loop"), then it will lose contact with the idler and accurate cueing will not be possible, since the idler tachometer counter provides such information relating to tape movement.

To overcome the potential problem of throwing a loop in the tape which would detrimentally affect the cueing operation due to loss of contact by the idler 80 and therefore the tape tachometer counter, the tension arm 70 is repositioned to the left to increase the tension in the tape between the tension arm and the take-up reel 60 to thereby overcome the friction in the transport including friction caused by the scanner, the guides, the idler arm and the like. To increase the tension, the microprocessor merely moves the tension arm to the left to increase the tension on the tape and after the tension arm is moved to its new position, then the take-up reel will begin to supply or push tape toward the idler and the increased tension caused by the tension arm will prevent any slack occurring in the tape path.

The reel servo also has an acceleration loop control provided by the microprocessor to insure that during shuttle, the tape is not being moved too rapidly for either the take-up or supply reel. Thus, after the tension arm is appropriately located to provide the proper tape tension for packing the tape onto one of the reels as previously described, limits of tension arm movement are set (which are preferably different for each direction of tape movement) and as the tape is accelerated to its shuttle speed, any movement of the arm beyond one of the limits causes the take-up reel speed to be changed to return the arm to a position within the limits which returns the arm to the required tension.

Another mode that is programmed into the reel servo is a threading mode which is carried out before any active operational mode is performed. The microprocessor essentially determines if the transport has been operated after it has been threaded. If a tape is placed on the apparatus and is not manipulated to remove the slack in it, then if it is placed into one of the active operating modes, it could be possible to snap the tape taut and stretch it, or violently move the tension arm or the like, which could damage the tape and/or the transport components. Thus, the threading mode is effective to slowly wind the supply and take-up reels relative to one another so as to bring the tape to a proper tension level and effectively slowly and carefully remove any slack in the tape and this is done by microprocessor through programmed control. Essentially, the program includes an instruction which asks if the tape had previously been threaded before an active operation is commenced and if it had not, then it slowly drives the reel motors to remove the slack in the tape by measuring the position of the tension arm and as the tape is brought to its proper tension level, the tension arm will be moved into a positional range that is appropriate for the particular operation that will be accomplished. When it reaches its nominal range, then the program control permits the active operation to commence.

Broad Scanning Head Servo Description

In accordance with the present invention, the scanning head servo is controlled by the microprocessor 30 as shown by the functional block diagram of FIG. 7. The block diagram shows that the majority of the functions are performed within the microprocessor 30 and output signals are produced for application to circuitry external to the microprocessor.

The head scanner servo comprises two loops, i.e., a phase loop and a velocity loop. A scanner tachometer input is applied to each of the loops via a line 100. The phase adjustment loop has a vertical reference signal applied via input line 102 to a phase adjustment delay generator 104 which has output line 106 providing one input to a phase detector 108 which is essentially a comparator that measures the phase difference between the reference signal and the tachometer signal. The difference represents an error signal that is applied to a digital-to-analog converter 110 which provides an analog output signal on output line 112 that is summed into a junction 114 to a motor drive amplifier 116 for controlling a head scanner drive motor 118. A capacitor and resistor lead/leg phase error circuit 120 is provided to compensate the phase loop of the scanner servo.

The other loop is a standard velocity loop that uses the tachometer signals from line 100 which are applied to a delay circuit 122 which provides a delayed scanner tachometer signal on line 124 that is applied to one input of a second comparator 126. The other input of the comparator 126 receives undelayed tachometer signal information. An output 128 of the comparator 126 provides an error signal that is also converted by a digital-to-analog connector 130 to an analog signal on line 132 that is summed at junction 114 into the input of the motor drive amplifier. The scanner servo is much more accurate than many prior art devices because the delays are very accurate. This is due to the fact that the delays are computed to a very high resolution by the microprocessor. In this regard, for a 625 PAL or SECAM system, an internal microprocessor timer has a period of 20,000 microseconds which means that the delay is accurate to one part in 20,000 microseconds. This permits the gain bandwidth of the velocity loop to be increased quite significantly to obtain better and more accurate control. It also enables the velocity loop to perform the majority of the error correction and the phase loop merely provides the proper positioning of the scanner, i.e., it is merely a positioning loop. The counting function and error determining portions of both of the loops are performed by the microprocessor and the only portion of the functional block diagram that is performed outside of the microprocessor is from the digital-to-analog converter through the motor drive amplifier.

Broad Capstan Servo Description

Turning now to one particular application for the present invention, the capstan servo is illustrated by the functional block diagram of FIG. 8. The capstan servo functional block diagram illustrates that the transport of the tape 72 is controlled by the capstan 76 which has a drive motor 150 with an associated tachometer, the tachometer providing tachometer pulses on line 152 an inner servo loop. The tachometer signal is applied to an up/down counter 154, the output of which is applied to a digital-to-analog converter 156 via line 158 and its output is fed to a motor drive amplifier 160 that controls the motor 150. The up/down counter 154 also has an input line 162 extending from the output of a 16-bit counter 164 which has as a reference frequency a 4 MHz signal applied thereto via line 166. The counter essentially controls the frequency of the reference signal that is applied to the up/down counter through its output line 162. The microprocessor 30 loads a number into the counter via line 168 which determines the output frequency on line 162. Varying the number that is loaded into the counter 164 changes the division function to thereby vary the output reference signal frequency and thereby vary the speed of the capstan. The upper left hand portion of the block diagram illustrates the control track reference logic system which has inputs comprising the reference vertical information via line 170, the color framing information via line 172. These signals enable logic circuitry 174 to generate a control track record signal on line 176, ¼ frame and ½ frame rate signals on lines 178 and 180 and a control track reference frame signal on line 182, which latter three signals are applied to and used by the microprocessor 30 as shown. On the right side is a similar circuit which utilizes control track playback signal information from line 184 obtained from the tape during reproducing. Control track play logic circuitry 186 provides a control track frame rate signal on line 188, ¼ frame and ½ frame rate signals on lines 190 and 192, which signals are also applied to the microprocessor. The microprocessor determines from these signals whether the recorder must perform a color frame match operation. If the apparatus is operating as a 525 line NTSC recording and reproducing apparatus, it will color frame match using the ½ frame rate signal and if it is operating as a 625 line PAL or SECAM system, it will color frame match using the ¼ frame rate signal. The control track play logic therefore is adapted to control the tape so that proper color framing is achieved during normal reproduce operations.

There is also an input line 194 to the microprocessor which applies a signal from a variable control potentiometer 196 on the front panel of the recorder which controls the capstan and therefore the tape speed. The variable control signal is converted from analog to digital form for use by the microprocessor, which could be done by the analog-to-digital converter shown in FIGS. 17a and 17b if desired. The digital variable control signal is applied to the microprocessor which then applies a corresponding a digital word to the counter 164 for controlling the speed. As will be hereinafter described, the control is nonlinearized and programmable to provide nonlinear control of capstan speed as a function of the potentiometer position and the actual tape speed. In other words, most of the possible rotational movement of the potentiometer will control the speed in the range from 1/30 of the normal play speed to ½ of the normal play speed and a small amount of the rotation of the potentiometer will control the speed from ½ of the normal play speed to normal speed and fast motion. This permits the range of actual rotation of the potentiometer to be most fully utilized in the range of speed where more accurate control is desired. Since it is programmable, it desirably places the vernier control of the capstan drive, and hence tape speed, where it is most appropriately used. The nonlinear control of the capstan drive through the potentiometer 196 enables the operator to exercise more effective control of the tape transport through observation of the display of the information reproduced from the tape particularly during slow motion operating modes.

Additionally, when there is a change between one very slow slow motion speed and another slightly faster slow motion speed, and it is changed from one to another, the microprocessor is programmed to change rapidly between the two speeds. However, when the speed is approaching normal speed, then the actual change from one speed to another will be made more slowly. The transport handles these differences in the change at the various speeds more easily, but also as the picture is viewed, rapid changes that occur during extremely slow slow motion playback are more comfortable to a viewer than rapid changes that occur during slow motion speeds that approach normal speed reproducing.

Broad Automatic Scan Tracking Servo Description

In accordance with the present invention, the microprocessor controlled automatic scan tracking portion of the apparatus of the present invention will now be described in conjunction with the block diagram of FIG. 11. Other aspects of the automatic scan tracking servo will also be hereinfter described with respect to the block diagram of FIG. 14.

Figure 11:
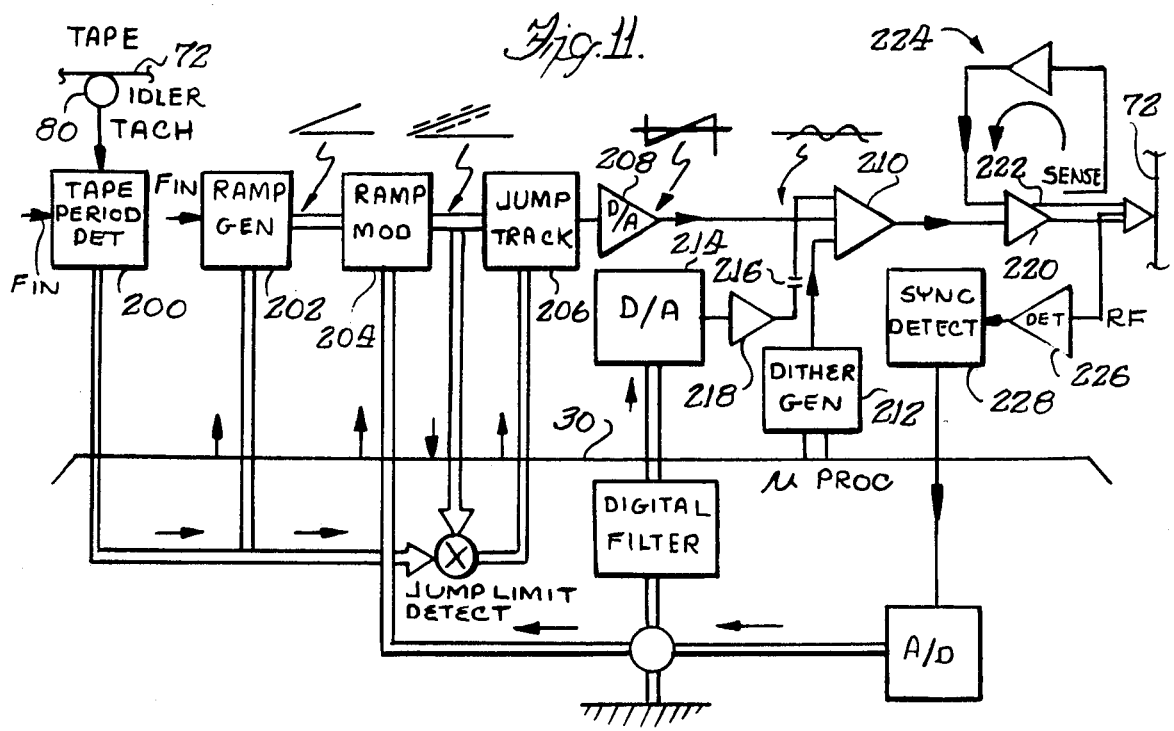
FIG. 11 is a functional block diagram of the automatic scan tracking servo system of the present invention.

The automatic scan tracking servo system shown in functional block diagram form in FIG. 11 controls the automatic tracking of the head during reproducing in the various operating speed modes such as slow motion, still frame or fast motion. As shown in FIG. 11, the idler 80 tachometer provides pulses to a tape period detector 200 which essentially measures the speed of the movement of the tape and does so by measuring the period of tape movement very accurately. The tape period detector effectively measures the frequency for the purpose of predicting the desired position of the head as a function of the tape speed. The tape period detector provides two 8-bit words to the microprocessor 30 which performs two functions utilizing the calculated period. The microprocessor applies a digital word to a ramp generator 202 which is actually an error generator which generates a digital equivalent of a voltage ramp signal whose slope is a function of speed. In effect it is generating a predicted tracking error which comprises a voltage whose slope increases as the tape speed is increased. Conversely, the slope of the voltage decreases as the tape speed decreases. The tracking error output is applied to a modifier circuit 204 which either increases or decreases the value, i.e., modulates the predicted ramp tracking error signal in accordance with d.c. errors that are detected. It effectively modifies the tracking error or slope of the ramp in order to obtain a true ramp tracking error signal that maintains the head accurately on the track during reproducing. The tape speed signal is also compared with the output of the modifier to determine if a track jump command should be issued. In other words, if the elevation of the head, i.e., the transverse position thereof, at the appropriate time during each revolution is such that, considering the speed that the tape is being moved, that it will reach a particular extended position, then a jump command will be issued to the jump track block 206 which will add a jump signal to the ramp tracking error signal at its output. The composite ramp tracking error signal is generated digitally and is converted by a digital-to-analog converter 208 to analog form for application to a summer 210 which sums the converted signal with that produced by a dither generator 212 and with an a.c. coupled error signal from a digital-to-analog converter 214 via capacitor 216 and amplifier 218. The summed signals are applied to a drive amplifier 220 which drives a deflectable piezo-ceramic bimorph element 222 carrying the video transducing head. An electronic damping loop indicated generally at 224 which is virtually identical to that described in Ravizza U.S. Pat. No. 4,163,993, assigned to the same assignee as the present invention, is provided. Also, the RF signal from the video head is applied to an amplitude modulation detector 226 which detects the RF signal having no envelope with an amplitude and phase, which vary in accordance with the dither signal that is applied thereto by the dither generator 212 and the position of head relative to the recorded track. This detected signal is in turn synchronously detected by a synchronous detector 228 to provide an analog positional error signal that is converted from the analog to a digital domain by the analog-to-digital converter within the microprocessor. This digital error signal is compared with a zero error signal (ground) and the microprocessor provides the d.c. error for modifying the error signal via the ramp modifier 204. The signal is also applied to a digital filter within the microprocessor which detects high rate geometric errors caused by distortions in the track or the like and its output is applied to the digital-to-analog converter 214 for analog conversion and combining with the ramp tracking error signal.

With respect to the operation of the digital filter shown in FIG. 11, it performs an integrating operation which is essentially an averaging function that is accomplished in the microprocessor. It essentially operates by utilizing three memory locations and performs an averaging of each sample location over several revolutions to obtain an average value for each of the sample locations. For each sample location, a digital number corresponding to the averaging operation is applied to the digital-to-analog converter 214 of the a.c. error correction circuitry shown in FIG. 11. Basically, at the first memory location, the most recent sample is averaged with the preceding samples by adding the value of the averaged preceding samples to the new most recent value and dividing by two. This value is then inserted into the first memory location. The second memory location utilizes the value placed in the first sample location with the preceding average value in the second location and sums them, divides by two to obtain the new value for the second memory location. The third memory location adds its previous average value with the new value from the second memory location, divides by two to provide a new value in the third memory location. This becomes the output of the digital filter which is applied to the digital-to-analog converter 214 and a.c. correction circuitry.

Broad Tape Sync Processing Circuitry Description

Figure 16:
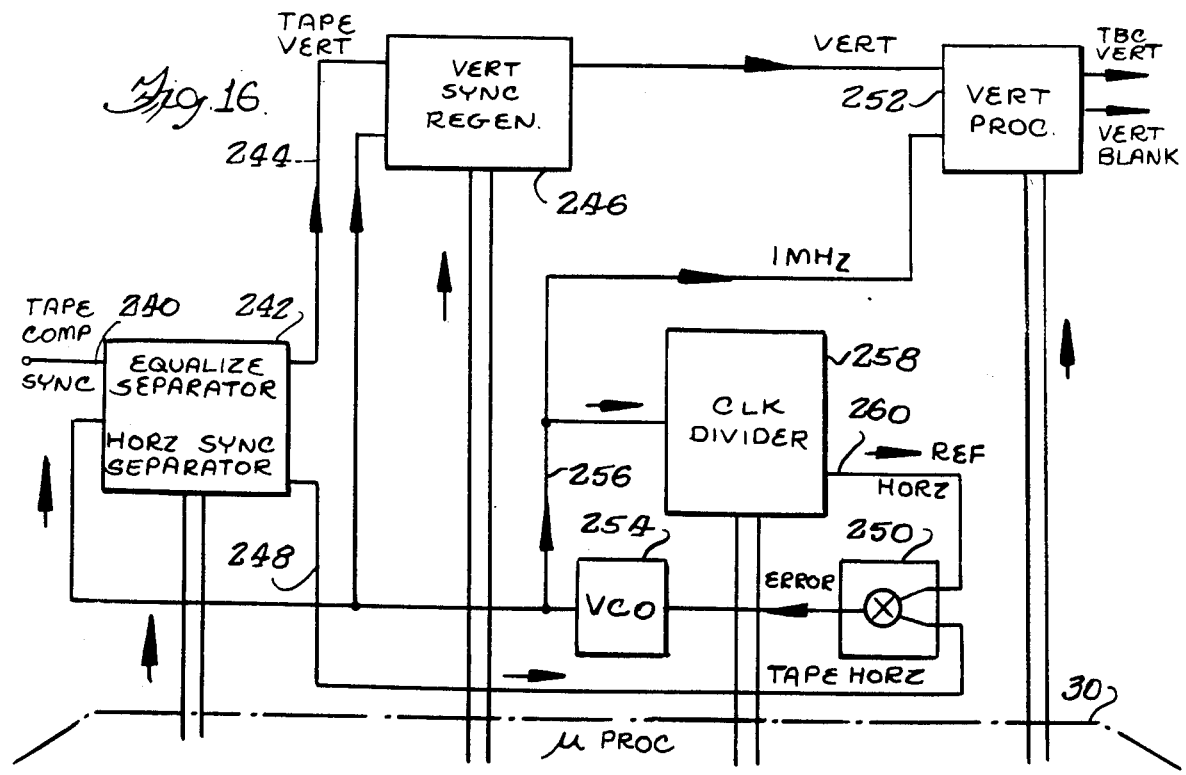
FIG. 16 is a functional block diagram illustrating the tape sync processor and time base corrector interface circuitry.

With respect to the tape sync processing circuitry of the apparatus embodying the present invention, reference is made to the block diagram shown in FIG. 16 which is shown having the microprocessor 30 interfacing with several of the blocks shown therein for the purpose of changing values in various components depending upon whether the recorder is adapted to operate as a NTSC video recorder with 525 vertical lines per frame or as a PAL or SECAM recorder with 625 horizontal lines per frame. The block diagram is shown to have a composite sync signal from tape during reproducing applied via line 240 to an equalization pulse separator and horizontal sync separator circuit 242 which has an output line 244 which extends to a vertical sync regenerating circuit 246 and another output line 248 which applies an off-tape horizontal signal to a comparator 250 comprised of a digital sample and hold circuit. The vertical regenerator 246 provides a vertical sync signal to vertical processing circuitry 252 which provides a time base corrector vertical sync signal to the time base corrector circuitry and vertical blanking signals to the signal system circuitry during reproducing. The comparator 250 is part of an automatic frequency control loop that has a voltage controlled oscillator 254 having an output line 256 extending to the vertical processor 252 and to a clock divider circuit 258 which has its division number supplied by the microprocessor. The division number is different depending upon whether the recording apparatus is operating in a 525 line or 625 line system. The divider output line 260 is applied to the other input of the comparator 250 so that the comparator compares the reference horizontal with the tape horizontal, provides an error signal to the voltage controlled oscillator 254 for properly controlling the frequency output from the voltage controlled oscillator 254. As is evident from the control loop, the output of the voltage controlled oscillator 254 is synchronized to off-tape horizontal sync. Moreover, the output of the tape sync processing circuitry is synchronized to off-tape sync so that if the tape speed is increased or decreased, the horizontal and vertical sync signals will vary in accordance with the proper timing to maintain the synchronism. The vertical regenerating circuitry is also adapted to be free running even though equalization pulses may not be present from the equalization pulse separator. This is required because of the fact that if the elevation of the reproduce head is extended relative to its nominal desired position, equalization pulses may not be reproduced and detected by the separator 242. The system therefore provides free running capability to apply equalization pulses where they should be if they are in fact not detected so that the vertical sync signals will continue to be present for operating the time base corrector. The system has another operational advantage in that if the recorder is turned on for the first time and the head is at an extended elevation or position such that no equalization pulses are being detected, it cannot supply them at the appropriate time because it has no memory of them previously occurring. In such instance, the microprocessor measures the elevation of the AST head and determines if it is in fact at an improper elevation to receive equalization pulses and if such is the case, then it will command a two track shift so that it will be placed in position where it will receive equalization pulses and will begin proper operation.

The Microprocessor Circuitry

Figure 17A:
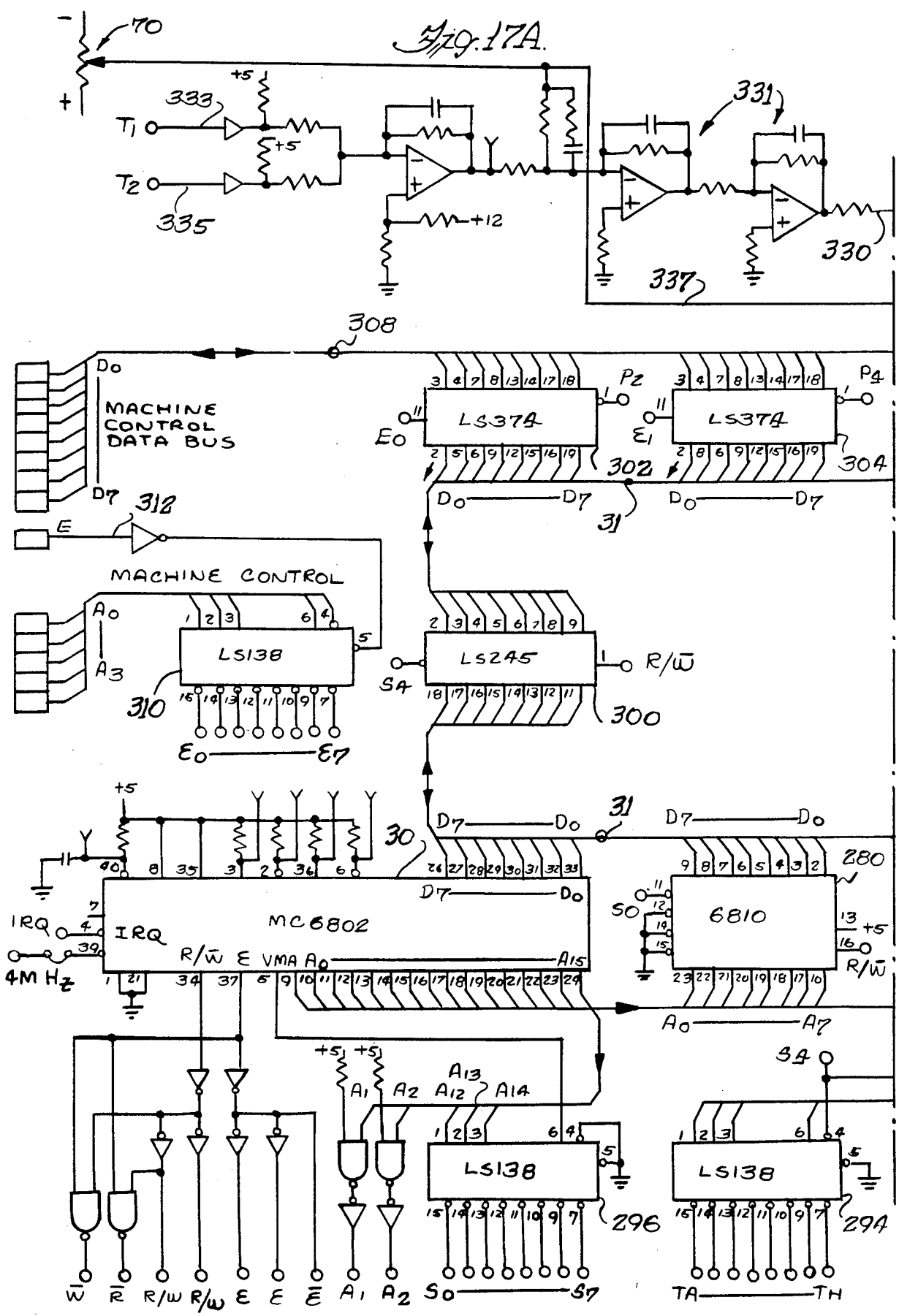
FIGS. 17a and 17b together comprise a detailed electrical schematic diagram illustrating the microprocessor together with machine control interfacing circuitry and multiplexing analog-to-digital converting circuitry.

Before describing the detailed electrical circuit schematic diagrams of the head scanner servo previously described with respect to the functional block of FIG. 5, the schematic diagrams which contain the microprocessor 30 itself will be briefly described in connection with FIGS. 17a and 17b which together comprise a single schematic. As previously mentioned, and as has been shown by the block diagram of FIG. 1, the bulk of the circuitry of the apparatus described herein is contained on only two printed circuit boards and one of said printed circuit boards contains the microprocessor itself. The layout of the circuitry is such that address control of bidirectional buffers enable the data bus from the microprocessor to be connected to either the first or the second printed circuit board. As shown in FIG. 17a, the microprocessor 30, which is a Motorola integrated circuit Model MC 6802 has 16 address lines which address circuit components as well as specific addresses of memory circuits. As shown on the lower portion of the microprocessor 30 in FIG. 17a, address lines $A_0$ through $A_{15}$ extend rightwardly to a random access memory 280 which is controlled by address lines $A_0$ through $A_7$, as well as respective programmable read only memories 282 and 284 (FIG. 17b) which are controlled by address lines $A_0$ through $A_{11}$. The address lines also extend to a buffer 286 which has output lines indicated generally at 288 which extend to the second printed circuit board address lines. The lines 288 also extend downwardly to respective decoder integrated circuits 290 and 292 which are used to select ports $P_0$ through $P_{15}$. The address lines also extend to yet another decoder 294 which provides selection of various programmable timer integrated circuits $T_A$ through $T_H$.

Decoders 290, 292 and 294 are enabled when a master decode enable line $S_4$ is active and this is provided by a master decode circuit 296 located to the left of the decoder 294. As is clearly illustrated, address lines $A_{12}$, $A_{13}$ and $A_{14}$ from the microprocessor 30 control the address selection master decode enable output lines $S_0$ through $S_7$ that activate various portions of the circuitry. For example, when active the decoded output line $S_0$ enables the random access memory 280, decode output $S_6$ enables the memory 282 and decode output $S_7$ similarly enables memory 284. The data bus 31 from the microprocessor comprises eight output lines $D_0$ through $D_7$ extending to the memories 280, 282, 284 as well as to bidirectional buffers 298 and 300. Buffer 290 has output lines that extend the data bus to the second printed circuit board, and it is activated by the decode output $S_5$. Activation of the decode output $S_4$ enables the decoders 290, 292 and 294 as well as the other bidirectional buffer 300 which effectively extends the data bus to the remaining circuitry shown in the upper portion of FIGS. 17a and 17b and to remaining circuitry on board No. 1.

Figure 17B:
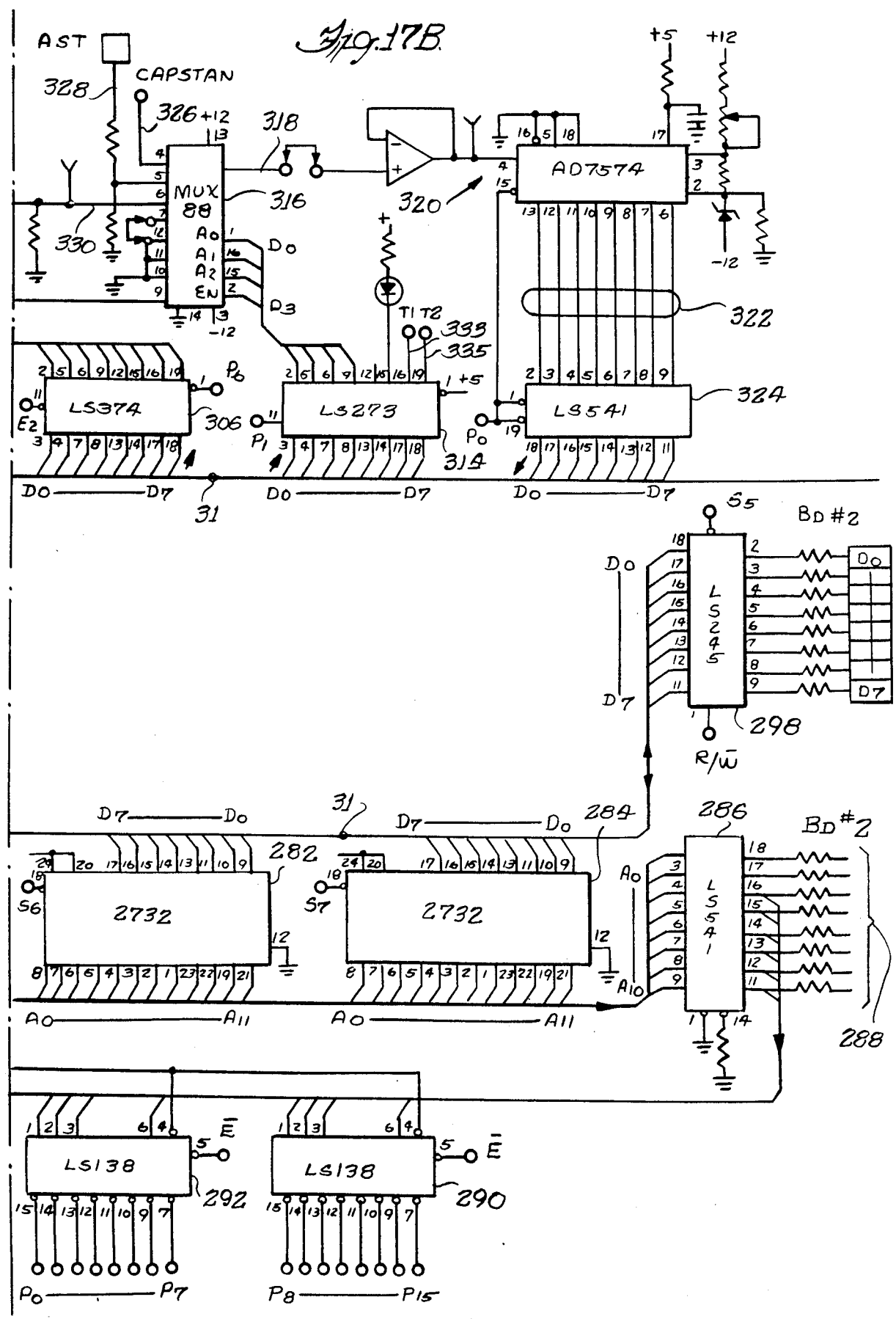

As shown in FIG. 17a, the data bus 31 has input latches 302 and 304 connected thereto and an output latch 306 being shown in FIG. 17b. The data lines 308 are also connected to these latches and the lines 308 represent a data bus to the machine control system which has a separate microprocessor controlled system for carrying out other machine control functions of the apparatus independently of the system controlled by microprocessor 30. The interaction of operator control and mode switches, diagnostics and the like with the servo system of the present invention is carried out through this data bus via the latches 302, 304 and 306. These latches are respectively enabled by enable lines $E_0$, $E_1$ and $E_2$ which are decoded outputs of a decoder circuit 310 that has operator activated address lines $A_0$ through $A_3$ from the machine control system. The decode circuit 310 is enabled by a line 312 from the machine control system. By selectively enabling decode output lines $E_0$, $E_1$ and $E_2$, data can be input into the latches 302 and 304 for communication onto the data bus of the microprocessor 30 and enabling the latch 306 permits data from the microprocessor 30 to be latched therein for communication to the machine control system via lines 308.

The remaining portion of the circuitry shown in the upper portion of FIGS. 17a and 17b concern the analog information input that is provided to the microprocessor 30. When port $P_1$ from decoder 292 is active, a latch 314 that is connected to the data bus can receive a data word which decodes an address for controlling a multiplexing switch 316. The switch 316 selects one of the left inputs thereof for application onto line 318 that extends to an analog-to-digital converter, indicated generally at 320, having output lines 322 which extend to a latch 324 which applies data onto the data bus for use by the microprocessor when a port line $P_0$ is enabled from the address decoder 292.

The multiplexing switch 316 can select a capstan servo control track error signal applied via line 326, an automatic scan tracking movable element position error signal applied via line 328 or a signal that is indicative of the position of the tension arm 70 applied via line 330. The circuitry at the upper portion of FIG. 17a provides an analog signal on line 330 that represents the position of the previously described tension arm through appropriate loop compensation circuitry indicated generally at 331. The arm positional reference for forward and reverse arm locations during shuttle and still frame reproducing is set by coding lines 333 and 335 by means of the output latch 314 from the microprocessor. In addition, line 337 can be selected to measure the actual mechanical arm position for tape threading and unthreading. Two sets of port and timer circuit decoders are employed in the preferred apparatus of the invention. One set has been previously described with reference to FIGS. 6a and 6b, namely port decoders 290 and 292 (FIG. 5b) and timer circuit decoder 294 (FIG. 6a). FIG. 8 illustrates the second set of decoders comprising port decoder 1002 and timer circuit decoder 1004. The first set of decoders illustrated in FIGS. 6a and 6b respond to selected ones of the address signals A0-A15 issued by the microprocessor 30, selected ones of the master enabling signals 50-57 issued by decoder 296 and system clock signal E to enable selectively ports and timer circuits of the machine communication circuitry 38, scanner servo 36, capstan servo 34 and reel servo 38 (FIG. 1). The second set of decoders illustrated in FIG. 8 similarly function to issue selectively port enabling signals (decoder 1002) and timer circuit enabling signals (decoder 1004) to the reference generator 40, the AST servo 44, tape sync processor 46 and TBC interface 50 (FIG. 1). More specifically the second set of decoders receives bufferend address signals over lines 1006 from the buffers 286 (FIG. 6b). These address signals together with master decode select signal 85 received over line 1008 from the master decoder 296 (FIG. 6a) and the system clock signal E received from the microprocessor 30 overline 1010 enable the decoders 1002 and 1004 to issue the port and timer circuit enabling signals according to the functions beng performed by the apparatus as determined by the operator manipulated controls and the controlling microprocessor software. In addition, the second set of decoders receives a read/write command W from he microprocessor 30 (FIG. 6a) over line 1012 and, through logic 1014 comprising NAND gates and inverters, generates retimed read command R, write command W and oppoistely phased master clock signals E and E. These signals are employed toegether with the port and timer circuit enable signals to control the operation of aforementioned reference generator 40, AST servo 44, tape sync processor 46 and TBC interface 50.

The Automatic Scan Tracking Servo Circuitry

While the operation of the automatic scan tracking system (AST) has been broadly described in connection with the functional block diagram of FIG. 11, the control of the correction and of the dither generator is such that there are significant improvements in the control and operation of this portion of the AST servo, compared to prior art systems such as those embodied in U.S. patent application Ser. No. 677,815 and U.S. Pat. No. 4,151,570, which are assigned to the same assignee as the present invention, and which generally perform similar functions. As has been broadly described, the dither generator produces a signal that is applied to the summer 210 shown in FIG. 11 which varies the drive signal to the drive amplifier 220 for deflecting the bimorph 222 in a manner whereby it is caused to oscillate the position of the head transversely relative to the recorded track as the head reproduces a track. The transverse movement is in the form of a dither or sine wave signal that is applied to move it slightly relative to the track to generate a track position error signal which is in the form of an amplitude modulation of the RF video signal reproduced by the dithered head.

While the use of dither is described in the aforementioned Ravizza U.S. Pat. No. 4,151,570, the amplitude of the dither applied to the bimorph in the present application is at a significantly reduced level so as to produce a lesser amount of intentional head to track deviation for the purpose of detecting tracking error. The monitoring of the error signal is also accomplished by the digital filter to provide a.c. correction to generate an additional error signal component for removing high rate geometric errors that are present. In the aforementionned Ravizza U.S. Pat. No. 4,163,993, geometric errors were detected and an a.c. error signal was produced in the analog domain by monitoring component signals at 60, 120 and 180 Hz frequencies and these error signals were combined to provide an error correcting signal for removing the high rate geometric errors. Since the dither frequency is desirably at a frequency of about 450 Hz, for reasons fully discussed in the aforementioned Ravizza U.S. Pat. No. 4,151,570, it should be appreciated that it is not possible to provide closed loop correction for errors that occur around the frequency of 450 Hz, for to do so would provide a bandwidth of only approximately 45 Hz in such a closed loop system. Accordingly, samples at frequencies of 60, 120 and 180 were taken over several cycles, integrated and summed to provide an error drive signal for providing error correction for such high rate geometric errors.

It should be appreciated that errors actually exist at much higher frequencies than 180 Hz and it is therefore desirable to provide more accurate geometric error correction during operation. If such can be reliably done, a more precise correction of geometric errors can be accommmplished. Also this can further reduce the required amplitude of the applied dither signal.

The present invention significantly increases the number of samples that can be taken from the reproduced RF video envelope and can generate a more accurate a.c. or geometric error correction signal in a way to increase the bandwidth up to approximately 840 Hz which represents a substantial improvement over prior art systems. Moreover, the dither, the synchronous detection, and the sampling of the signal are totally synchronized so that error measurements are accurate from one head scanning drum revolution to another and with respect to the maximum excursions of the head during the dithering operation.

Unlike the prior art invention, the present apparatus is completely phase synchronous, i.e., position synchronous as well as frequency synchronous, so that variations that would otherwise occur as a result of loss of phase synchronism will not be present and will therefore not detrimentally affect the accuracy of the curve fitting for correcting geometric errors. Additionally, the location of the samples can be moved to accurately fit the active video RF signal.

Figure 14:
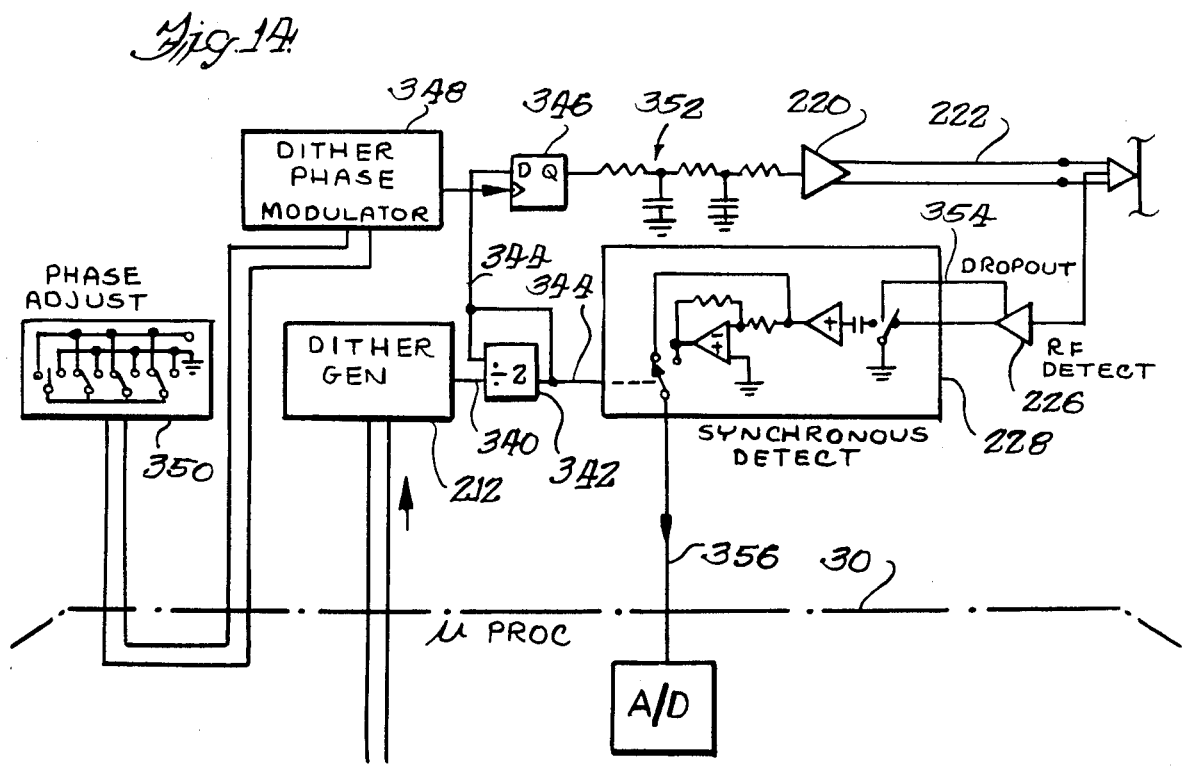
FIG. 14 is a functional block diagram illustrating the operation of the automatic scan tracking servo system synchronous detector embodying the present invention.
Figure 12:
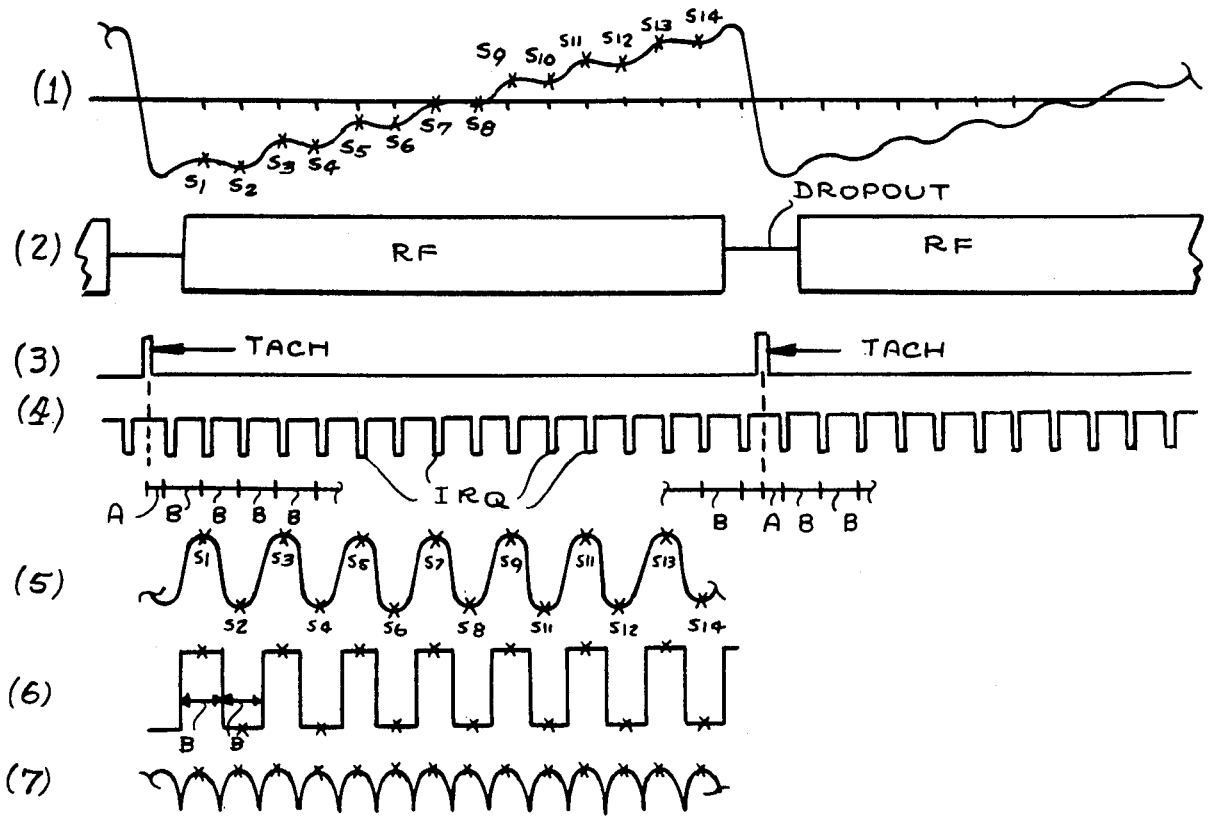
FIG. 12 illustrates timing diagrams which are useful in describing the operation of the automatic scan tracking servo of the present invention.
Figure 13:
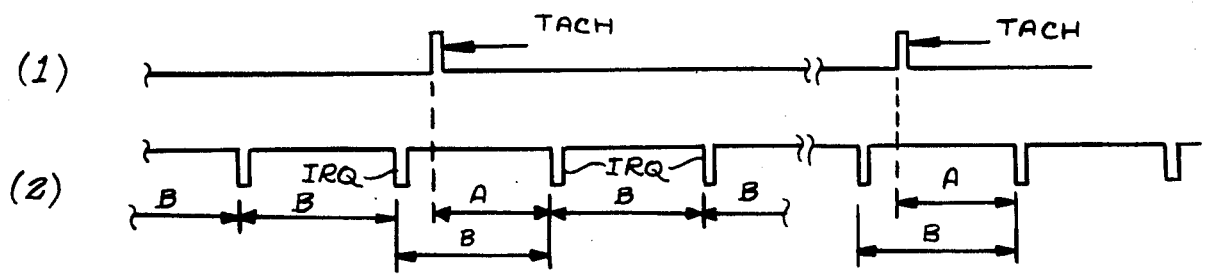
FIG. 13 illustrates timing diagrams which are also useful in describing the operation of the automatic scan tracking servo system embodying the present invention.

A functional block diagram of the circuitry that accomplishes the foregoing objectives is shown in FIG. 14 together with the accompanying timing diagrams of FIGS. 12 and 13. Turning initially to the block diagram of FIG. 14, the block diagram shows the dither generator 212 which is essentially a programmable counter that is controlled by the microprocessor 30 and provides clock pulses at an output 340 which clock a D flip-flop 342 that is connected to comprise a divide by two. The flip-flop 342 is connected by line 344 to control the operation of the synchronous detector 228 and also provides an input to another D flip-flop 346 that is in turn clocked by a dither phase modulator circuit 348 that is also controlled by the microprocessor 30. A dither phase adjustment manually programmable switch 350 is connected to the microprocessor and provides a digital number to the microprocessor which is used to control the dither phase modulator 348 to either advance or delay the phase of the dither signal that is controlled by the dither generator. The output of the dither phase modulator clocks the D flip-flop 346 whose output is applied to a dither filter 352 that converts the D flip-flop square wave output into a sine wave that is applied to the drive amplifier 220 that drives the bimorph as previously described. The reproduced RF signal from the video head is received by the RF detector 226 which has a drop-out control line 354 for blocking the RF signal during the drop-out time during each revolution of the scanning drum. The output of the RF detector 226 is applied to the synchronous detector 228 which has its analog output applied to an analog-to-digital converter in the microprocessor via line 356.

The output from the divide by two 342 controls the switching of the synchronous detector 228 so that it inverts the RF detected signal at the appropriate rate so that the magnitude of the error that is present is provided at the output 356 thereof, except during the drop-out time. The microprocessor has interrupt commands which are effective to store in internal memory a digital word corresponding to the analog value at the sample time that is determined by the occurrence of an interrupt. Through the course of a single rotation of the scanning drum carrying the reproducing head, i.e., one head pass, 14 samples are stored in memory for the NTSC 525 line system, (15 samples for the 625 line PAL or SECAM formats) from which the digital filter shown in FIG. 11 and the a.c. correction circuitry generates an a.c. error correcting signal which removes high rate geometric errors.

In accordance with an important aspect of the AST servo of the present apparatus, the relative timing of the operation of the dither signal, the synchronous detector and the interrupts which control the taking of the samples of the error are accurately synchronized to each head rotation so as provide accurate error measurements from which the digital filter generates the a.c. geometric error correction signal.

The nature of the operation of the block diagram of FIG. 14 can be more readily understood from the timing diagram shown in FIGS. 12 and 13. Turning initially to FIG. 12(1), a voltage waveform of the signal that is applied to the bimorph during still frame reproducing is illustrated and has a generally upwardly inclined portion with sharp downward resets occurring during every head pass or rotation of the scanner drum carrying the head. The general operation during still frame reproducing, in terms of the reset and ramp movement of the transducing head is comprehehsively described in Hathaway et al. U.S. patent application Ser. No. 677,815. In order for the transducing head to be properly aligned with the recorded tracks on tape for all the tape speeds other than normal speed (the tape speed during recording), the transducing head must be gradually ramped in one direction or another depending upon whether the tape is moving at a speed less than normal speed or greater than normal speed and the voltage waveform in FIG. 12(1) illustrates the movement of the transducing head during still frame reproducing which requires a reset at the completion of each rotation of the transducing head. FIG. 12(1) also illustrates a greatly exaggerated sinusoidal or dither signal applied to the bimorph carrying the head which results in the head being moved in a sinusoidal fashion transversely of the recorded track at it moves along the track. This provides an amplitude modulation of the envelope of the reproduced RF signal which is detected and used to derive an error correcting signal in the manner disclosed in the aforementioned Ravizza U.S. Pat. No. 4,151,570 as well as in the Ravizza U.S. Pat. No. 4,163,993. The relative positions of the upwardly inclined ramp and reset portions of the deflection producing voltage waveforms shown in FIG. 12(1) and the RF envelope shown in FIG. 12(2) illustrates that the resets occur during the drop-out located between each RF portion. The once around scanner tachometer signal shown in FIG. 12(3) also occurs in close proximity to the drop-out and the reset pulse. It is this tachometer pulse signal that provides the essential timing for the operation of an interrupt command (IRQ) shown in FIG. 12(4) as well as the operation of a synchronous detector which switches the applied dither signal to measure the head tracking error detected through the use of dither. The exaggerated dither signal is shown in FIG. 12(5), the synchronous detector switching waveform is shown in FIG. 12(6) and the output of the synchronous detector is shown in FIG. 12(7).

As previously mentioned, there are 14 samples taken along the active video portion and these samples, labelled $S_1$ through $S_{14}$, are located within the RF envelope and are shown on the voltage waveform of FIG. 12(1) as well as on the waveforms shown in FIGS. 12(5), 12(6) and 12(7). It is desirable to evenly distribute the samples along the active RF region so that the sample locations coincide with the peaks of the dither signal applied to the bimorph as shown in FIG. 12(5) and to appropriately locate them so that all 14 samples are present during each scan of pass of the reproducing head along the track. The samples that are taken are a function of the timing of the interrupt commands and are timed to the scanner tachometer pulses which bear a distinct positional relationship with the transducing head since the head and tachometer are both mounted on the rotating scanning drum.

It should be understood that while the 14 samples (for a NTSC format signal; 15 samples for a PAL or SECAM signal) are evenly distributed along the RF envelope, there could be additional samples taken or the same number of samples could be distributed differently therealong if desired. Since the bulk of the geometric errors generally are present at the beginning and at the end of each reproduced RF portion, it may be desirable to bunch the samples nearer the ends thereof to obtain somewhat different information than is shown and described with respect to FIG. 12. For example, while the samples shown in FIG. 12(7) are located at the peak of the resulting output of the synchronous detector, samples may be taken on opposite sides thereof near the peak if desired. Since the error is generally a cosine function, there could be 30 degrees variance from the peak and still obtain a reasonably accurate error measurement. Whether the samples are bunched in this manner or are evenly spaced throughout the RF portion, the values of the error samples taken are then applied to the digital filter shown in FIG. 11 for the purpose of generating the geometric error correction signal.

The location of the samples is a function of the timing of the interrupt commands and such can be programmed in a manner whereby the samples can be appropriately located along the active scan by the head as desired. Regardless of the actual programmed locations of the samples, switching by the synchronous detector is optimumly placed at the zero crossing of the dither sine wave as is shown by comparing FIG. 12(6) with FIG. 12(5) and therefore inverts the lower portions of the sine wave to obtain the rectified sine wave shown in FIG. 12(7). It is also desirable to have the interrupt commands occur in the middle of the half periods of the switching, i.e., midway between the switching transitions as shown, so that the error that is measured will be the peak error as shown in FIG. 12(7) rather than at a location that is substantially downwardly on the curve. Obviously, if the sample locations were close to the actual switching locations, then the error would be quite small and would provide inaccurate values relative to the actual error values. The location of the switching of the synchronous detector as well as the location of the interrupts are programmed in the software for the microprocessor and can be easily adjusted to provide accurate control. Moreover, the phase of the dither signal that is applied to the drive amplifier for driving the bimorph is also adjustable by virtue of the manual control of the dip switch 350 shown in FIG. 14.

To obtain the optimum phase synchronous relationship between the phase of the dither, the operation of the synchronous detector and the location of the interrupt for obtaining the samples from the synchronous detector, these three operations are synchronized to the occurrence of the scanner tachometer pulse during each revolution of the head. More particularly, at the occurrence of the one around tachometer pulse, the microprocessor utilizes a counter which counts from the occurrence of a tachometer pulse and keys the interrupt timing so that the first interrupt occurs at a precise time location after the occurrence of the tachometer pulse and then utilizes a second counting period to control the timing of subsequent interrupts so that 14 samples are optimumly provided during each cycle. At the occurrence of the next tachometer pulse, the first period is again counted, followed by the second period as is desired. Since the presence of the tachometer signal controls the critical timing between it and the first interrupt, the interrupt commands are retimed, if necessary, every revolution of the scanner. However, it should be appreciated that the outward appearance of the timing of the interrupts will not vary as is broadly shown in FIG. 12(4) and which will be more fully described with respect to FIG. 13. In addition to precisely controlling the location of the first interrupt relative to the tachometer pulse, the switching of the synchronous detector is also controlled in a very similar manner, i.e., a first period corresponding to a precise count in a counter controls the switching of the synchronous detector and subsequent switching is controlled by a second count which corresponds to another period so that the timing between switches of a synchronous detector is essentially identical to the period between occurrence of adjacent interrupts. This is evident by comparing FIGS. 12(4) and 12(6). The initial period after the occurrence of tachometer and the first switching of the synchronous detector is such that it occurs exactly midway between the interrupts or, stated in other words, that the interrupts occur midway between successive switchings of the synchronous detector as also shown by comparing FIGS. 12(4) and 12(6).

From the foregoing, it should be appreciated that the tachometer pulse controls the timing of the interrupts and of the switching of the synchronous detector very precisely as is desired and as can be appreciated from FIG. 14, the dither reference generator provides an output signal that is controlled by the counter for the synchronous detector and this control signal is also applied to the D flip-flop 346 for providing the dither signal to the drive amplifier 220. Thus, the dither is synchronously operated with the synchronous detector and is therefore synchronous with it. However, as is shown in FIG. 14, the output from the divide by two 342 is applied to the D input of the D flip-flop 346 which is clocked by the phase modulator of the dither that is in turn controlled by the dip switch 350 through operation of the microprocessor. Since the phase modulator clocks the D flip-flop 346, varying the value of the dip switch input to the microprocessor varies the phase of the dither. It can be advanced or retarded so as to locate the phase of the dither precisely with respect to the interrupts and the synchronous detector so that the relationship shown in FIGS. 12(5), 12(6) and 12(7) can be obtained. In this manner, the three components, i.e., the dither, the operation of the synchronous detector and the interrupts can be made to be exactly phase synchronous so that the error signals that are applied to the analog-to-digital converter in the microprocessor for use by the digital filter (FIG. 11) will be phase synchronous and constant from head pass to head pass and will therefore result in the very accurate geometric error correction signal.

To more fully appreciate the operation of the circuitry that precisely controls the location of the switching of the synchronous detector and of the location of the interrupts, the latter will be explained with respect to FIG. 13. The switching of the synchronous detector is accomplished in a manner that is substantially identical to that that will be described with respect to the interrupt timing, with the only difference being the particular count of the counter during the initial period and subsequent periods between switches thereof so that the relationship of the switching to the interrupt as previously described will be obtained. The tachometer pulses shown in FIG. 13(1) initiate a counter in the microprocessor which will count for a period A as shown in FIG. 13(2) so that when its terminal count is reached, the first interrupt will occur. After the A count has been accomplished, then the microprocessor switches to a B count which is substantially longer and corresponds to that which will evenly space 14 samples along the active scan region as shown in FIG. 12(1) as well as FIGS. 12(4) through 12(7). Interrupts will continue to occur subsequently of the first interrupt after the presence of a tachometer pulse until another tachometer pulse occurs. The subsequent tachometer pulse will cause the first period A to be counted again and will trigger the first interrupt after the tachometer pulse for a subsequent revolution of the head. However, since the interrupts are generally preferably evenly spaced for each head revolution, there wil be no phase change during subsequent head revolutions once the system is set up, so that the termination time of the A period, which controls the location of the first interrupt, should be essentially identical to the location that would occur as a result of the termination of a B period of the final interrupt period before the occurrence of a subsequent tachometer pulse. However, the first interrupt after a tachometer pulse is actually controlled by the A period counter and the system is therefore assured of accuracy since it happens during each head revolution. Stated in other words, the interrupts are retimed every rotation of the head, whether retiming is necessary or not. This provides a safeguard to the accuracy of the system that prevents any drift in phase synchronism during operation.

While the automatic scan tracking servo has been functionally described with respect to FIG. 11 which illustrates the manner in which jumps are performed and error correction accomplished, the manner in which the error correction is carried out is shown in the block diagram of FIG. 15. This in turn is carried out by the specific circuitry shown in FIGS. 21a and 21b. Referring to the block diagram shown in FIG. 15, the microprocessor 30 communicates with a programmable timer chip 360 which has counter sections 362, 364 and 366, the section 364 of which operates as a one-shot multivibrator. A 1 MHz input signal on line 368 clocks the counters 362 and 366 and they operate such that counter 362 provides an output frequency count on line 370 that is fixed (although at different rates depending upon whether it is a 525 line or 625 line system). The counter 366 is programmable and provides a variable frequency output on line 372 which counter varies in accordance with the 16-bit word that is applied via the data bus 31 which reflects the tape speed period. Up/down counter clock logic, indicated generally at 374, effectively controls a clock rate which is a function of the difference between the frequency of the signals on lines 370 and 372 and the clock clocks an up/down counter 376 via clock line 378 with an up/down control line 379 also being controlled by the up/down counter clock logic. The incrementing or decrementing of the counter 376 generates the ramp slope which is the predicted value determined by the tape speed. The up/down counter provides an 8-bit value representing d.c. error signal on lines 380 which extend to a digital-to-analog converter 382 that has an analog output line 384 which applies the d.c. error signal to an amplifier 386 and to an amplifier 210. The lines 380 also are applied to a latch 390 that latches the value of the up/down counter and the microprocessor uses this 8-bit word to determine the position of the head for the purpose of determining whether a jump is to be made at the appropriate time. If a jump is to occur, a jump command on a line 392 will occur and when the scanning drum tachometer signal on line 394 is present, AND gate 396 will provide a signal to trigger the one-shot 364. A jump direction signal on line 398 is also applied to the clock logic 374 for determining the proper direction of a jump. The d.c. correction loop utilizes the information that is latched in latch 390 and after processing, the microprocessor applies data via the data bus 31 to hard load the up/down counter 378 for the purposes of further incrementing or decrementing the count to apply the d.c. positional correction. At a different time the microprocessor hard loads a digital-to-analog converter 214 which provides an output to an amplifier 218 that is capacitively coupled by capacitor 216 to the amplifier 210. The up/down counter can be controlled by the counters 362 and 366 and additionally can be hard loaded by the microprocessors to provide the a.c. and d.c. error correction which results in the final automatic scan tracking error signal.

Figure 21B:
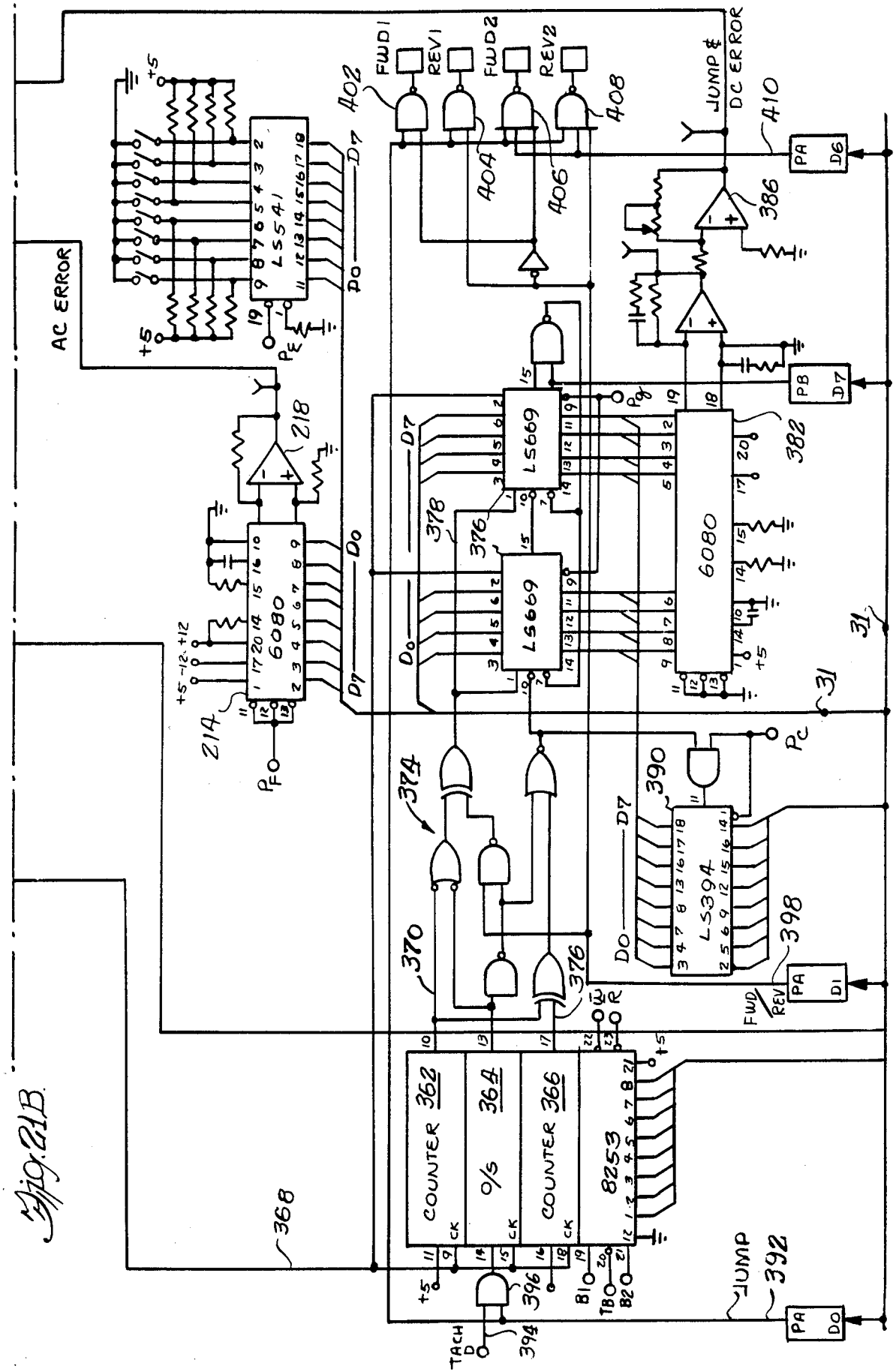
Figure 23:
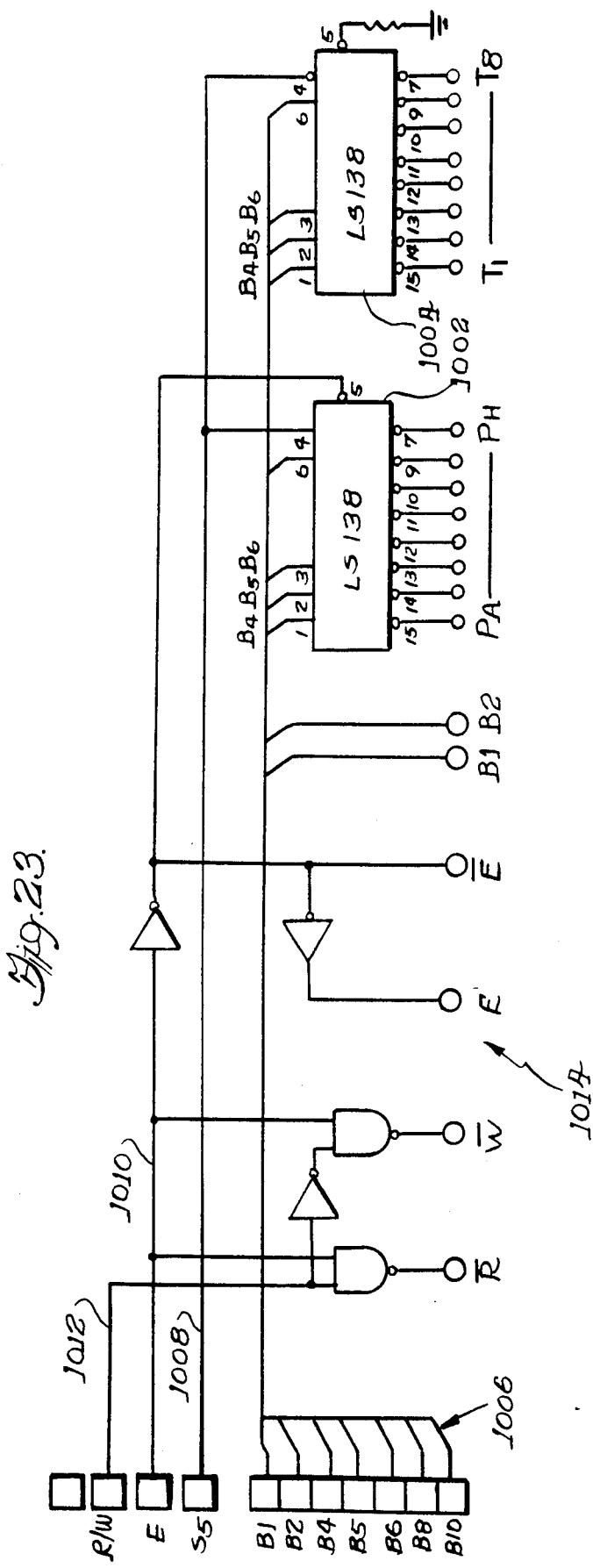
FIG. 23 is a detailed electrical schematic diagram of a board decode circuitry of the apparatus embodying the present invention.

The detailed circuitry which carries out the operation of the functional block diagram of FIG. 15 is shown in the electrical schematic diagram of FIGS. 21a and 21b. The detailed operation of the schematic will not be described for the reason that it operates as described with respect to the block diagrams of FIGS. 11 and 15. As shown in the upper portion of FIG. 21a, the automatic scan tracking damping loop 224 is illustrated and it is virtually identical to that used in the Ampex Model VPR-2 recorder. The portion of the Product Manual which describes such operation is specifically incorporated by reference herein. As shown in FIG. 21b, the microprocessor applies signals onto the data bus for controlling the jump commands as previously described and a jump command on line 392 is gated to the one-shot 364 which is triggered when the once around scanning drum tachometer signal is applied to and enables the AND gate 396. The one-shot 364 controls the clock logic 374 to provide 64 counts into the up/down counter 376 to provide a discrete jump of predetermined magnitude for moving the movable element to make the head jump a track. The line 398 controls whether the jump will be forward or reverse and steers the logic 374 to control the up/down line of the up/down counter 376 apropriately. The active jump line 392 also extends to gates 402, 404, 406 and 408 so that one input of each of these gates is enabled when a jump is to occur. The forward and reverse line 398 also control whether the forward or reverse gate is enabled and a third line 410 controls whether there will be a two track jump as opposed to a single track jump. The output lines from the gates 402 through 408 are applied to the time base corrector circuitry to inform it that a jump of the appropriate magnitude and direction is about to occur.

The Reel Servo Circuitry

Figure 18:
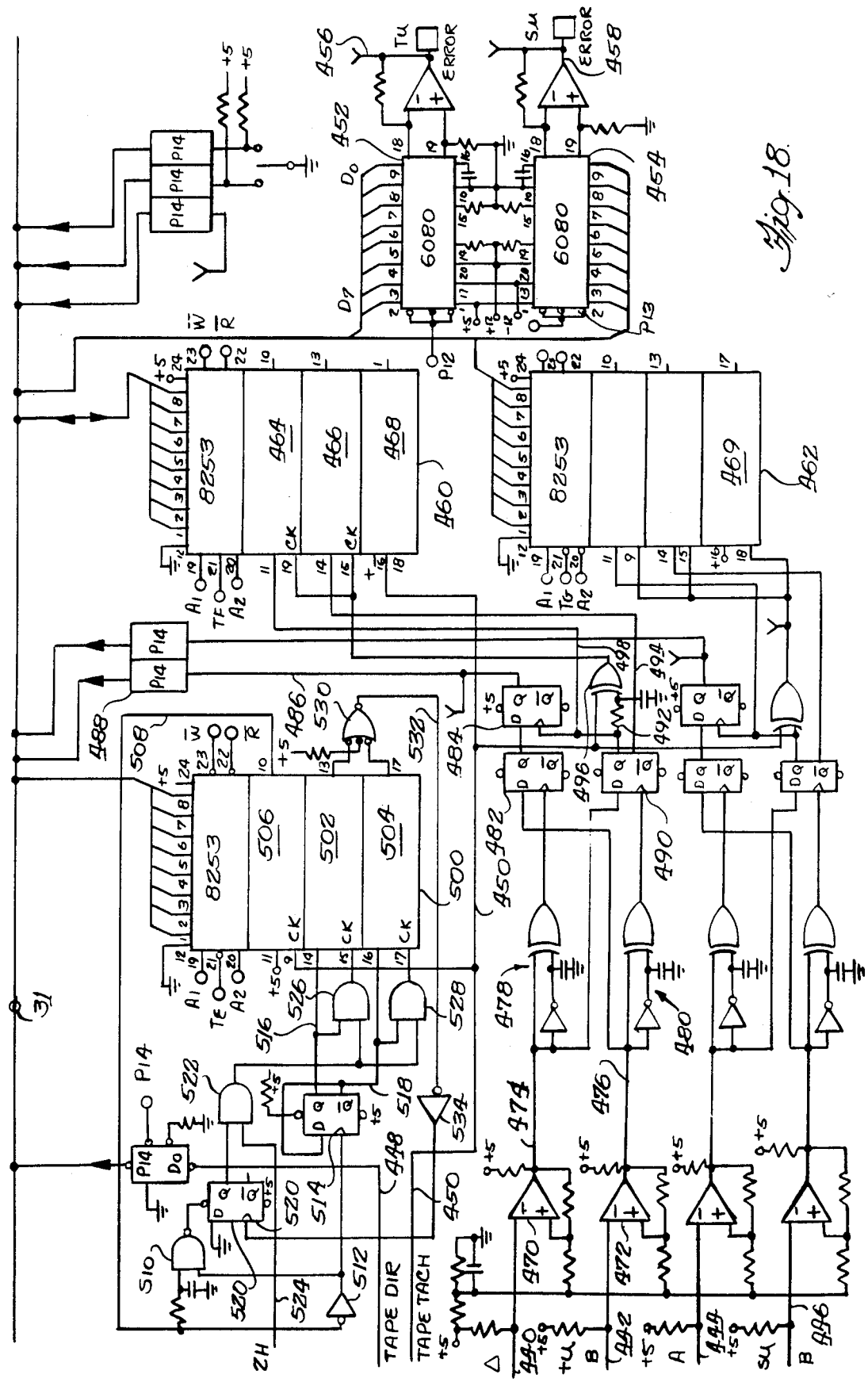
FIG. 18 is a detailed electrical schematic diagram of the reel servo circuitry of the present invention, which reel servo circuitry carries out the operation of the functional block diagrams shown in FIGS. 5 and 6.

The reel servo system that has been previously described with respect to the block diagrams of FIGS. 5 and 6 is largely controlled by the microprocessor 30 together with the specific circuitry shown in FIG. 18 in accordance with the timing diagrams of FIGS. 9 and 10. Turning to the circuitry of FIG. 18, it is shown to be interconnected to the main data bus 31 via various lines and has inputs comprised of take-up reel tachometer information via lines 440 and 442, supply reel tachometer information via lines 444 and 446 as well as tape direction information from line 448 and tape tachometer information via line 450. The output signals from the microprocessor 30 are directed through the data bus 31 to digital-to-analog converters 452 and 454 which provide output drive signals to the take-up reel motor drive amplifier via line 456 and to the supply reel motor drive amplifier via line 458. As previously mentioned, the diameter of the tape packed on each reel is measured by the reel servo circuitry for the purpose of programming the torque that will be required on the reels during various operating modes. More specifically, by knowing the diameter of tape pack on the take-up reel 60 and supply reel 64, torque can be programmed so that the tension on the tape is maintained in a proper range during the various modes. It is desirable to maintain the appropriate torque so that tension is maintained at proper levels during operation. The reel tape pack diameter information is also useful in monitoring the operation of the system and if the measured reel diameter is greater than a maximum known actual value, then the microprocessor knowns that something is wrong in the system. Moreover, as tape is being wound on or off one of the reels, it is known through the diameter values that it is approaching the end so that the microprocessor can slow down the reel speeds to prevent tape from flying off the reel.

The reel servo system not only is capable of measuring the diameter of tape pack on both of the take-up and supply reels, it also instantaneously determines the direction that the reels are rotating. The servo system also has information relating to the tape speed and direction and uses the tape period information for use in the automatic scan tracking servo system, particularly to assist in determining whether a track jump is to occur at the next opportunity.

Returning to the aspect of determining the tape pack diameter on the take-up and supply reels, a counter chip 460 is adapted to acquire information for determining the take-up reel tape pack diameter and a second integrated circuit counter chip 462 is adapted to supply comparable information for the supply reel. These circuits are identical and have 8-bit bidirectional data lines interconnected to the data bus 31 for communicating with the microprocessor. The counter chip 460 has two counters 464 and 466 which alternately accumulate a count of tachometer pulses from processed tape tachometer and a third counter 468 accumulates tape tachometer pulses directly from the idler 80 and therefore provides an indication of the tape speed. Since any one of the counters in the chip 460 circuit can be addressed through address lines $A_1$ and $A_2$ when enabled by the TF enable line, the microprocessor has access to the tape speed count from the counter 468 circuit and therefore the count is not needed for the same purpose in the other integrated circuit chip 462 which has comparable information relating to the supply reel. However, a counter 469 is used with the microprocessor 30 to determine supply reel speed during a tape threading operation. The counters 464 and 466 alternately accumulate a tape tachometer count which clocks the counters when they are enabled and they accumulate counts for a period corresponding to the reel tachometer period. Thus, during each rotation of the take-up reel, there will be a tape tachometer count accumulated in the counters 464 and 466 in a unique manner which will be described in connection with the timing diagrams of FIG. 9. When one counter is accumulating counts, the other effectively stores the previously accumulated count and whenever a positive-going transition occurs as a result of a tachometer pulse being produced due to rotation of the take-up reel, the counter that had been counting will be stopped and the other counter initiated. The two counters alternate their operation in this manner so that one of the counters always contains a count value that is indicative of the reel speed relative to the tape speed, thereby providing the diameter of tape pack on the reel.

The circuitry which controls the counters in FIG. 18 includes input take-up reel tachometer signals on lines 440 and 442 which are 90 degrees apart, with the inputs being applied to respective comparators 470 and 472 having respective output lines 474 and 476 which extend to respective multiply-by-two circuits 478 and 480, each of which is comprised of an EXCLUSIVE OR gate, an inverter and capacitor which operate to provide an output pulse at the EXCLUSIVE OR gate output for each edge or transition that is produced by the associated comparator. The output of the EXCLUSIVE OR for multiplier 478 triggers a D-latch 482 which has its Q output extending to the D input of another latch 484 which provides a direction value on line 486 that extends to a buffer 488 which provides a signal onto the data bus 31. The level of the line indicates the direction that the take-up reel is rotating. The output of the multiply-by-two 480 clocks another D-latch 490 which has its D input provided by line 474 and the Q output on line 492 and the $\overline{Q}$ output on line 494 of the second latch 490 provide signals for enabling either the counters 464 or 466. The Q output line 492 is also applied to an EXCLUSIVE OR gate 496 which has one input provided by the tape tachometer pulse signal on line 450. The output of the EXCLUSIVE OR 496 produces a clock signal on line 498 for clocking both counters and it clocks the enabled one at a rate corresponding to the rate of the tape tachometer signal. The use of the EXCLUSIVE OR gate 496 overcomes a problem that would arise as a result of the tape being stuck and the reels continuing to move. If the tape is stuck, there will not be a tape tachometer pulse received and then the counters 464 and 466 will not be accurate. Since the next clock pulse clears and starts the other counter, if no tape tachometer pulse is generated then the circuit operation will fail. To overcome this problem the EXCLUSIVE OR gate 496 provides a clock edge that will validate the counters in the absence of a tape tachometer pulse. The reel tachometer will provide a single clock pulse to one of the counters that will result in the counter accumulating a count of one and this is detected by the microprocessor as being an invalid condition that indicates the reels are still turning while the tape is stopped. The microprocessor then shuts down the reel motors.

The operation of the above circuitry can be more clearly understood by referring to FIG. 9. FIG. 9(1) represents an exaggerated illustration of the processed tape tachometer pulses that are received by the counters 464 and 466. FIGS. 9(2) and 9(3) illustrate the input signals on lines 498 and 494 to the two counters 464 and 466, respectively, it being appreciated that the illustration of FIG. 9(2) is the inverse of FIG. 9(3). Whenever a positive-going transition appears on either of the input lines 498 and 494, the counter receiving the positive-going edge will be reset and will begin accumulating count as shown in FIGS. 9(4) and 9(5). When a subsequent positive-going transition on the other counter input occurs, the first counter is stopped and the second counter will be cleared and begin accumulating count. The illustration of FIG. 9(2) shows a varying duration period which is shown to be exaggerated to illustrate a pronounced change in the reel tape pack diameter. The longer the duration of a level, the larger the reel tape pack size and conversely, if a very narrow or short duration level occurs, it is an indication that the reel tape pack size is smaller and would therefore accumulate a lesser count in the active counter.

If the microprocessor 30 interrogates the counters 466 and 468, it will obtain a value from both counters and it is programmed to utilize the higher count of the two. Thus, if the interrogation occurs at the point in time $P_1$, the counter 464 contains a higher count than counter 466 and the microprocessor will utilize the higher count of the counter 464 in performing its calculations. However, if the interrogation occurs at the point in time $P_2$, then counter 466 will have a larger accumulated count and it will use this value. It should be appreciated that if the reel tape pack diameter is increasing, such as would be the case for the point $P_2$, the most accurate value from counter 466 would indeed indicate that it is increasing and this information is virtually instantaneously available. Conversely, if the reel tape pack diameter is decreasing, as would occur at point in time $P_3$, the counters would be enabled and zeroed more rapidly so that the value at $P_3$ would be available very quickly, as shown in FIGS. 9(2) and 9(3). Therefore, by using the higher valued counter of the two counters, the microprocessor has available to it the pertinent information relating to reel pack diameter at any particular time. It should be appreciated that the circuitry for the supply reel is identical to that of the take-up reel so that the diameter of the tape on the supply reel can also be calculated at any time.

The diameter numbers that are obtained are integrated by the microprocessor to have a stable average value of the diameter of tape wrap.

In accordance with another important aspect of the invention, the reel servo circuit of, FIG. 18 also contains circuitry which measures the tape period, i.e., the inverse of the tape speed and the tape period information is used by the microprocessor primarily for predicting the ramp slope and whether a track jump operation should be accomplished at the appropriate time during each revolution of the tranducing head. For this reason, the tape period circuitry is primarily used for the automatic scan tracking system, but since it utilizes the tape tachometer information for providing a clock time period it is conveniently located in the area of the circuitry which contains the reel servo circuitry.

The value of the tape period is determined in a manner very similar to that described with respect to the take-up reel tape pack diameter measurement and in this regard, the circuitry includes a counter integrated circuit chip 500 which includes two programmable counters 502 and 504 which alternately accumulate a 2H rate count via line 524 during a period of tape movement that is a function of the tape tachometer pulses on line 450. Thus, a tape tachometer signal on input line 450 is applied to the clock input of a counter 506 which is programmed to act as a divider and which divides the tachometer rate for a NTSC signal by five which output signal appears on line 508 that extends to a NAND gate 510 and to an inverter 512, the output of the inverter of which clocks a D flip-flop 514 configured as a divide-by-two having Q and $\overline{Q}$ outputs which are applied to the inputs of the counters 502 and 504 by respective lines 516 and 518. The NAND gate 510 controls a D-latch 520 and sets the same so that its Q output enables an AND gate 522 which has as its other input the clock signal on line 524 which is at a 2H rate which clocks the counters through respective AND gates 526 and 528.

During operation, the 2H clock pulses clock the appropriately enabled counter 502 or 504. Referring to FIG. 10(1), the 2H clock is shown to be exaggerated to illustrate fewer than actual number of pulses that occur. The waveform of FIG. 10(3) is the complement of that shown in FIG. 10(2). If the tape is moving rapidly, then the period of the signals in FIGS. 10(2) and 10(3) will be shorter than when the tape is moving more slowly. Thus, the waveforms shown in FIGS. 10(2) and 10(3) are exaggerated to illustrate varying rates of speed of the tape for purposes of illustration. The occurrence of a positive-going edge in either of the waveforms of FIG. 10(2) or 10(3) will cause the appropriate counter to be reset and begin counting the number of 2H clock pulses that occur until the other counter receives an enabling positive-going edge. This causes the other counter to be reset and begin counting, and simultaneously stops the count of the previously counting counter. As is illustrated from FIGS. 10(4) and 10(5), when the tape is moving more slowly, the active counter will accumulate a larger count than when the tape is moving more rapidly.

As was the case with respect to the take-up and supply reel counters, when the microprocessor interrogates the counters 502 and 504 to determine the tape period, it will take the larger of the two counts as the accurate value. The benefit of having both counters available for the microprocessor is that they provide accurate and instantaneous information relating to the tape period. By using two counters, the larger count will be reasonably accurate and the value is immediately available for use by the microprocessor during operation.

It is also essential that the microprocessor knows when the tape has in fact stopped. The count increases as the tape slows and if the tape is stopped, then the count will eventually reach the terminal count of the counter and will roll over and begin anew. Since this would provide a count that would be incorrect, provision is made for preventing this from occurring and this is accomplished by a gate 530 having input lines provided by the output of the counters 502 and 504. When either of the counters reaches terminal count, it will provide an output signal on one input of the gate 530 which in turn will provide a low output on line 532 that extends to the clock input of the D flip-flop 520 via inverter 534. The clocking of the D flip-flop 520 causes its Q output to go low and disable gate 522 which blocks the 2H frequency clock so that the counters 502 and 504 will no longer count. Since this occurs at the terminal count of the counters, the microprocessor knows by virtue of a terminal count being received upon interrogation, that in fact the tape has stopped. Once the tape moves again so that a tape tachometer pulse occurs, the signal will be applied through counter 506 to one input of gate 510 which will set the flip-flop 520 causing its Q output to go low and enable gate 522 to resume clocking of the counters 502 or 504.

The Scanning Head Servo Circuitry

Figure 20:
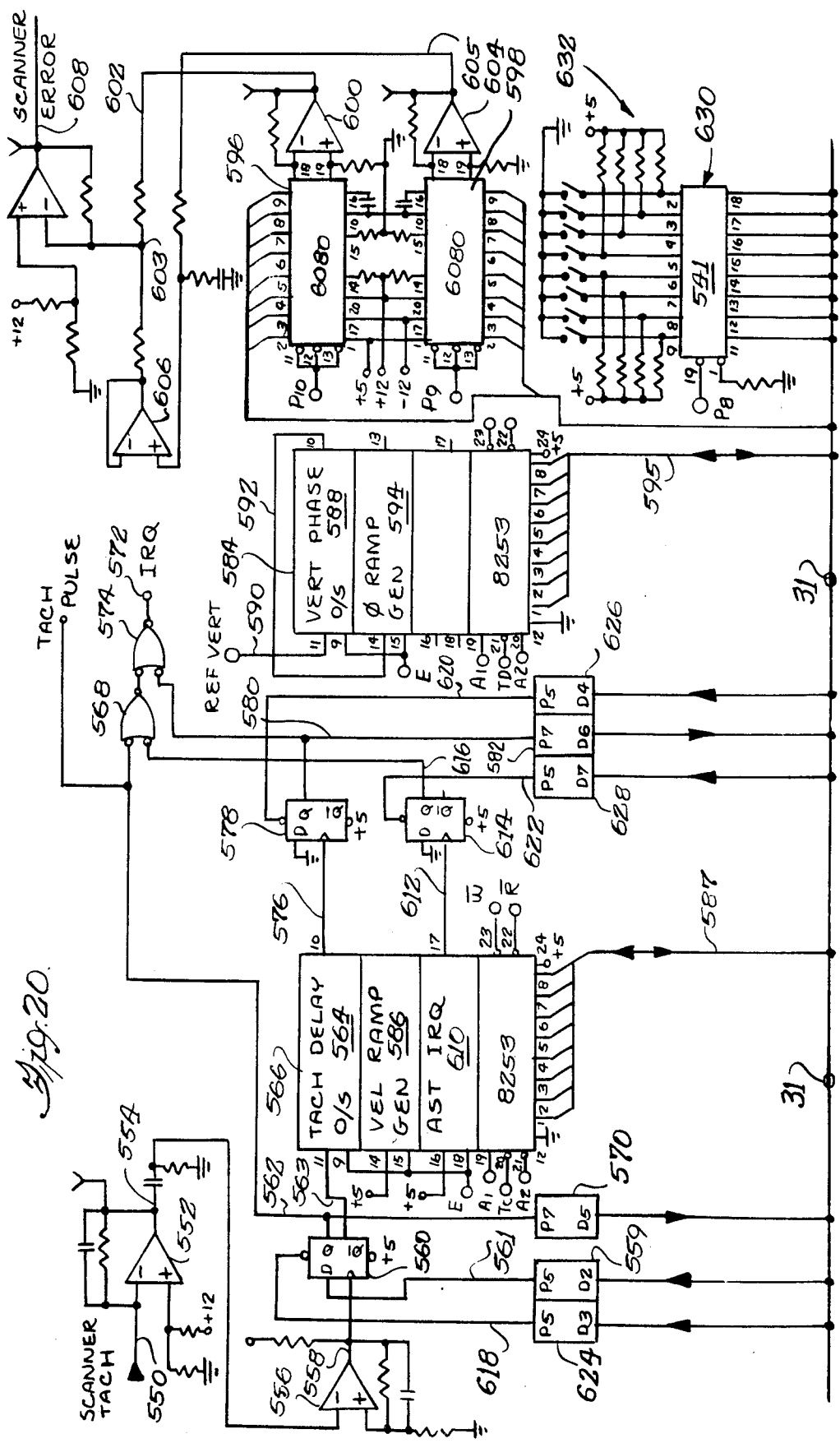
FIG. 20 is a detailed electrical schematic diagram illustrating the scanner servo circuitry of the apparatus of the present invention, which detailed circuitry carries out the operation of the block diagram of FIG. 7.

The detailed circuitry which carries out the operation of the rotating head or scanner servo shown in the block diagram of FIG. 7 is shown in FIG. 20. As previously mentioned, the scanner servo is comprised of two servo loops, i.e., a velocity servo loop and a phase servo loop. Since the accuracy of the velocity servo loop is exceedingly high, the phase servo actually operates as a positioning servo loop to properly phase locate the scanner once it has been synchronized or locked by virtue of the operation of the velocity servo loop. The scanner servo circuitry is extremely powerful and flexible in the breadth of its operational capabilities, in part due to the fact that it is under microprocessor control. By virtue of this fact, the scanner phase position can be easily advanced or retarded relative to reference vertical and can be further manipulated to accommodate various time base corrector apparatus which may require varying lead times.

Now turning specifically to FIG. 20, a scanner tachometer pulse synchronous with head rotation is applied to input line 550 which is connected to a low impedance input amplifier 522, the output of which appears on line 554 which is capacitively coupled to a slicer 556. The output line 558 of the slicer provides a timing pulse that is independent of the amplitude of the input signal from the scanner tachometer applied on input line 550. This pulse clocks a D flip-flop 560 which receives a run command from the microprocessor 30 over line 561 via tristate latch 559. The flip-flop has its $\overline{Q}$ output 563 connected to a tachometer delay one-shot 564 of a timer chip 566 and to a gate 568. Its Q output line 562 is connected to a tri-state buffer 570 that is in turn connected to the data bus 31. When a scanner tachometer pulse is applied to input line 550, a low signal is produced on line 562 which sets the tri-state buffer 570 as well as provides an interrupt signal (IRQ) on line 572 via gates 574 and 568. The interrupt is applied to the microprocessor which causes it to cease its current activity and determine where the interrupt originated. By virtue of the tri-state buffer 570 being activated, the microprocessor can determine that the interrupt originated from the first scanner tachometer pulse signal.

A particularly important aspect of the circuitry of the scanner servo system involves the capability of the microprocessor to accurately determine the phase of the tachometer and this is accomplished by providing a second scanner interrupt signal to the microprocessor following the first one, with the second interrupt being delayed by a predetermined time period that is slightly in excess of the maximum time required for the microprocessor to cease the present instruction and store all of the data that it is currently processing. In other words, since it may require upwards of 20 microseconds to complete the housekeeping activity before it can process another interrupt, the second scanner interrupt signal is delayed approximately 20 microseconds subsequently of the first interrupt and the microprocessor will thereby have time to complete its current operation and be ready to immediately process the second scanner interrupt. This permits the scanner servo to effect control of the head rotation with a timing resolution within one microsecond, which is within the resolving capability of the microprocessor.

To accomplish the delay, the scanner tachometer signal on line 563 is applied to the one-shot 564 which provides a delayed scanner tachometer signal on output 576 that is 20 microseconds later. This clocks a D flip-flop 578, so that its Q output line 580 is provided to the gate 574 to provide a second interrupt command on line 572. At the same time it activates gate 574, the Q output line 580 also sets a tri-state buffer 582 whose output is applied to the data bus so that when the second interrupt occurs, the microprocessor can strobe the tri-state buffer 582 and indeed determine that it is the delayed scanner tachometer interrupt. Once the second interrupt is received, the microprocessor can immediately examine the values in the timer chip 566 and in a timer chip 584 and determine if any velocity and/or phase error exists. In this regard, the timer chip 566 has a velocity ramp generator 586 that is clocked by a one MHz clock from the reference generator and at the occurrence of the second scanner tachometer interrupt, the microprocessor inspects the digital value that is present in the velocity generator at output lines 587 and then retriggers it.

Similarly, the timer chip 584 contains a vertical phase one-shot 588 which is triggered by reference vertical on input 590 which originates from the reference generator and this one-shot is variable in that it is under microprocessor control and its period can be advanced or retarded in accordance with instructions that are provided by the microprocessor, including the aspect previously described with respect to advancing or retarding the head rotation phase. The output from the vertical phase one-shot appears on line 592 which is connected to the input of a phase ramp generator 594 that is also clocked by the one MHz clock. The digital value of the phase ramp generator at output lines 595 is similarly examined at the occurrence of the second scanner tachometer interrupt to determine if any phase error exists. The existence of the input signal on line 592 will retrigger the phase ramp generator 594 and it will continue being clocked until the second interrupt occurs.

By virtue of the microprocessor obtaining the values from the velocity ramp generator 586 and the phase ramp generator 594, it then determines what, if any, phase and velocity error exists and applies an error signal through the data bus 31 to respective digital-to-analog converter 596 and 598. The digital-to-analog converter 596 has output lines which are connected to amplifier 600 which provides an output on line 602 which represents the velocity error and this is summed within a phase error component signal at the summing junction 603 that is obtained from the digital-to-analog converter 598 through lines which are connected to an amplifier 604 whose output is in turn connected by line 605 to a second amplifier 606. The sum of the velocity and phase error appears on line 608 which extends to the motor drive amplifier which drives the scanner motor.

The timer chip 566 also includes a second 610 defined as the automatic scan tracking interrupt and it is a rate generator counter that is clocked by the one MHz clock and provides a high signal on output 612 which clocks a D flip-flop 614 which provides an interrupt signal on line 616 that extends to the gate 568 and provides an interrupt to the microprocessor. The microprocessor knows that the interrupt from the automatic scan tracking counter is an automatic scan tracking interrupt as opposed to a scanner or delayed scanner tachometer interrupt by virtue of the fact that both of the tri-state buffers 570 and 582 are inactive. After the interrupts have occurred, the microprocessor is adapted to clear the flip-flops 560, 578 and 614 via reset lines 618, 620 and 622, respectively, connected to tri-state latches 624, 626 and 628 which receive their activating signals from the microprocessor via the data bus.

As previously mentioned, the apparatus may be operatively connected to various types of time base correctors which require varying amounts of head rotation or phase advancement depending upon the amount of delay that is necessary for the operation of the particular time base corrector and in this regard, an input buffer 630 is provided which has eight bits of information that are effectively applied by a dip switch 632 that may be set to provide the proper amount of phase adjustment of the scanner. It is contemplated that eight bits of tachometer phase adjustment is not required so that the input buffer 630 may be effectively divided into two functions, with the rightmost four lines providing scanner phase tachometer adjustment, whereas the four leftmost lines may provide initiation of test modes. When the microprocessor strobes the buffer 630, it obtains the number therein for operating the scanner phase adjustment and uses this to vary the time of the vertical phase one-shot 588 which triggers the phase ramp generator 594. In this manner, the vertical phase can be moved appropriately for the particular time base corrector that is being used with the apparatus.

The Capstan Servo Circuitry

Figure 19A:
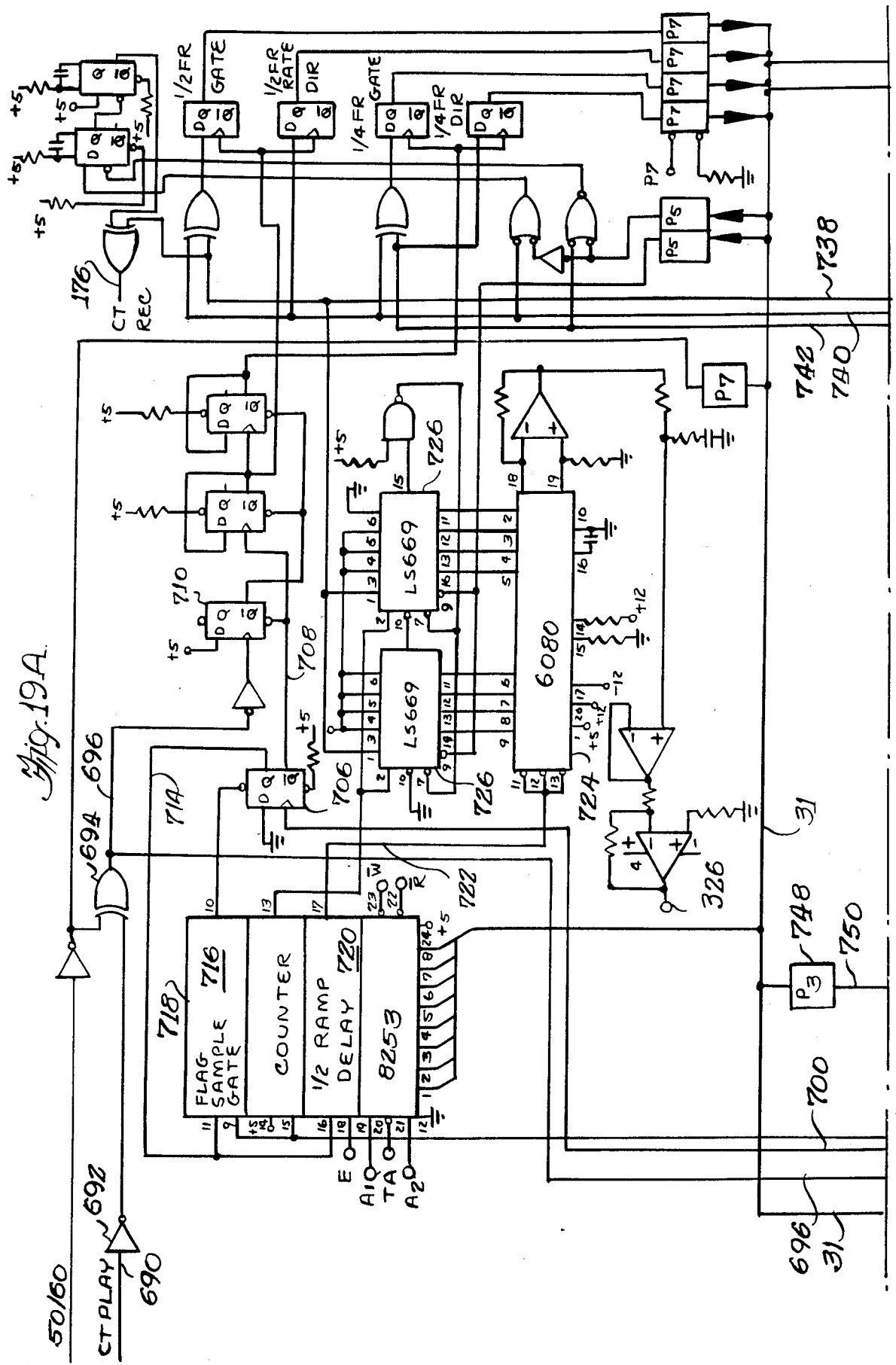
FIGS. 19a and 19b together comprise a detailed electrical circuit schematic diagram of the capstan servo circuitry of the apparatus, which detailed circuitry carries out the operation of the block diagram shown in FIG. 8.
Figure 19B:
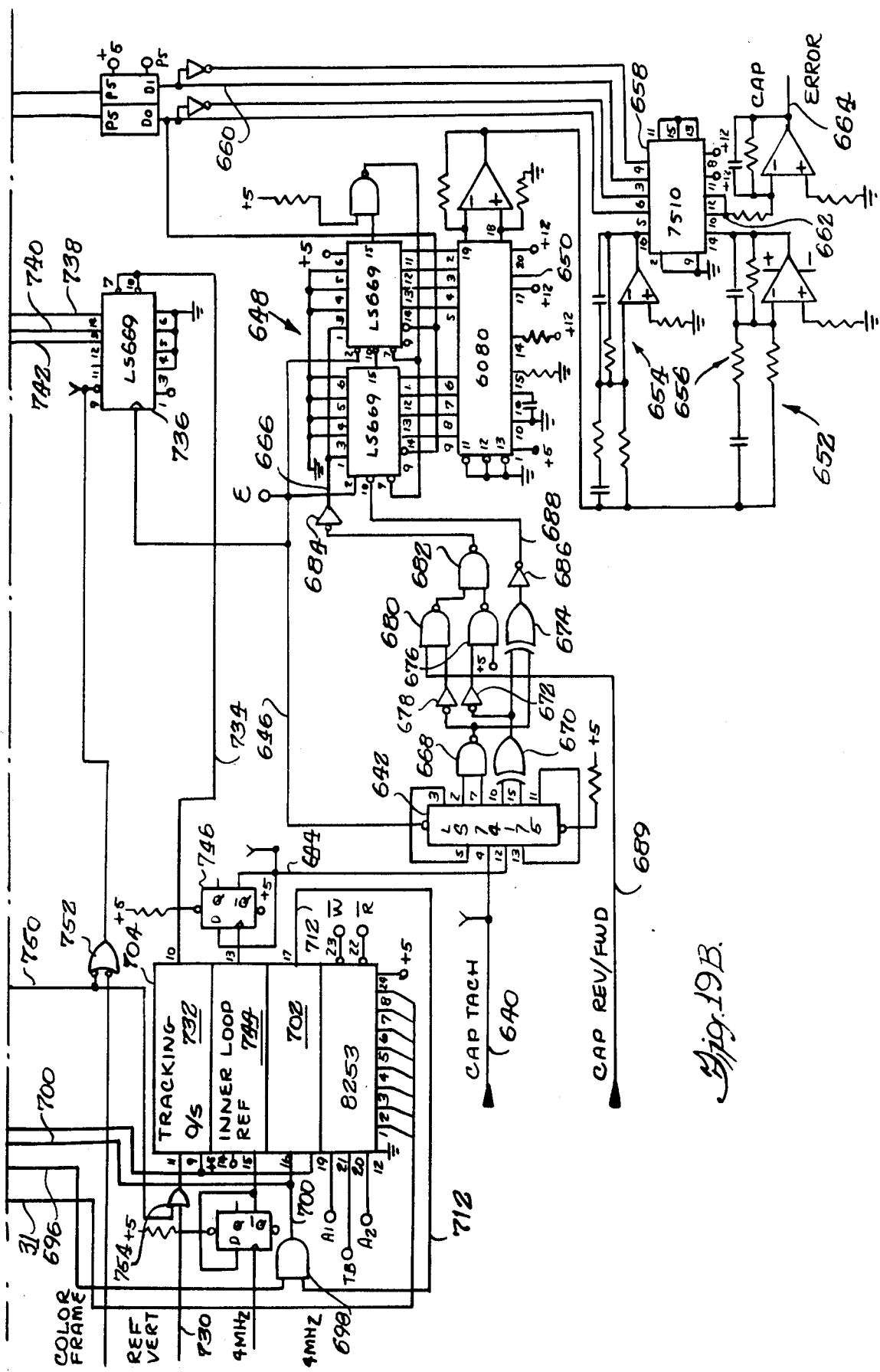

The capstan servo described in the block diagram of FIG. 8 is carried out by the detailed circuitry shown in FIGS. 19a and 19b. The capstan tachometer signal is applied on line 640 (FIG. 19b) which extends to a D latch which is part of the quad D latch integrated circuit 642 and the reference input frequency signal is applied via line 644. The latches are clocked by the microprocessor output clock E via line 646 and this clock also clocks an up/down counter 648, the output of which is applied to a digital-to-analog converter 650 which provides an analog output signal to the drive amplifier circuitry, indicated generally at 652. The circuitry includes a high gain section 654 and a low gain section 656 and a switching circuit 658 controlled by the microprocessor to either provide a high or low gain error signal. Line 660, controlled by the microprocessor, controls the switching circuit 658 to either apply the high gain signal from the upper circuitry 654 or the low gain signal from the lower circuitry 656 through the switcher onto line 662 which results in the capstan error signal being produced at the output line 664.

The circuitry shown in FIG. 19b effectively compares the phase of the reference on line 644 with the phase of the capstan tachometer on line 640 and provides a capstan servo error signal to control the precise speed of the capstan. The illustrated circuitry has the advantage that it does not suffer from common problems that can cause a servo system to run away in that it is incapable of doing so because of the absence of any capstan direction sensitivity, or any upper or lower speed limits. The circuitry provides an analog output which achieves a phase lock without excessive overshoot and eliminates the possibility of reverse run away, even if the control variable rate, i.e., the capstan tachometer, exceeds the reference rate in the reverse direction. More specifically, common prior art capstan servos can run away in two different ways. The first can occur if the polarity of the feedback is reversed from that defined according to the normal capstan direction without a corresponding reversal of the generated error. The second way in which the capstan can run away occurs when the up/down counter is permitted to rollover when the counter limit conditions are reached. The present circuitry automatically overcomes these problems by virtue of the fact that it is automatically compensates for the capstan direction or error changes.

The circuitry uses the fully synchronous up/down binary counter 648 and appropriate gating to enable the counter and to control an up/down control line 666. The reference input and tachometer inputs are automatically guided to increment or decrement the counter 648 in accordance with the direction lines. The output of the D latches for the capstan tachometer line 640 is applied to a NAND gate 668 and the reference signal is gated through the D latch and it is connected to an EXCLUSIVE OR gate 670. The NAND gate 668 provides a low output for every positive transition of the capstan tachometer pulse and this low output signal has a duration of one clock period. The reference signal that is applied through the D latch to the EXCLUSIVE OR gate 670 produces a low signal for every transition of the reference signal and this low signal also lasts for one clock period. The output from the EXCLUSIVE OR 670 is applied to an inverter 672, as well as to one input of another EXCLUSIVE OR gate 674, with the output of the inverter 672 being applied to a NAND gate 676. The NAND gate 668 output is applied to an inverter 678, as well as to the other input of the EXCLUSIVE OR gate 674. The output of the inverter 678 is applied to one input of a NAND gate 680 and the outputs of NAND gates 680 and 676 are applied to NAND gate 682, the output of which extends via an inverter 684 and line 666 to the up/down control of the up/down counter 648. The output of the EXCLUSIVE OR gate 674 is applied through an inverter 686 and line 688 to the enable the input of the up/down counter 648.

The operation of the logic circuitry is effective to control the up/down control line 666 so as to change the digital value of the counter in the proper direction to reduce the error. If the system contains no error, then the reference and capstan tachometer signals will be coincident and in such event, low outputs will be produced by the NAND gate 668 as well as the EXCLUSIVE OR gate 670 and both inputs will cause the EXCLUSIVE OR gate 674 to disable the up/down counter so that it will neither be incremented or decremented by the clock. If only one of the gates 668 or 670 is active, then the logic circuitry will cause the up/down line to be controlled at the proper signal level so as to either increment or decrement the counter in the correct direction to reduce the error. The gate 680 also has one input supplied by a capstan forward and reverse control line 689 which automatically steers the logic to control the up/down control line so as to reduce the error regardless of the direction the capstan is being driven.

In accordance with another aspect of the capstan servo, the recorded control track information is used in the conventional manner and this operation is also accomplished under microprocessor control. As shown in FIG. 19a, the control track signal on input line 690 is applied through inverter 692 and EXCLUSIVE OR gate 694, whose output appears on line 696 which extends downwardly to an AND gate 698 (FIG. 19b) that has its output line 700 applied to the input of a one-shot multivibrator 702 that is part of programmable timer chip 704. Line 700 also extends to clock a D flip-flop 706 (FIG. 19a) which has a $\overline{Q}$ output line 708 that clears a flip-flop 710 that provides a playback flag. The freewheeling one-shot 702 has output line 712 that extends to the other input of the AND gate 698 and the AND gate and one-shot operate to block any spurious control track signals that may be present on line 696 until shortly before the control track pulse is expected to occur, at which time the free-wheeling one-shot changes state to enable the legitimate control track pulse to be applied and be gated through the AND gate 698 and again trigger the one-shot 702. In the event that a control track pulse is not present, then the change of state of the free-wheeling one-shot 702 timing out will similarly cause an output signal on line 712 and the AND gate will provide a clock signal on line 700 to flip-flop 706 in the same manner as would an actual control track pulse. The only difference is that it will be slightly advanced relative to when it should occur which will cause a slight drift in the rate of the control track, but will not be of sufficient magnitude to create any significant problem during the time that control track is not present. An output line 714 from flip-flop 706 is applied to the input of a flag sample gate counter 716 of a programmable timer chip 718 as well as a ½ ramp delay one-shot 720, the latter of which provides an output on line 722 which triggers a digital-to-analog converter 724 which samples the value of up/down counter 726 which contains the digital values of the control track signal. The ½ ramp delay 720 effectively causes the digital-to-analog converter 724 to sample the value of the counter 726 at the mid-point of the frame signal and properly times the control track playback signal. Stated in other words, the digital-to-analog converter 724 is triggered by the ½ ramp delay 720 so that the control track sample which is delayed from the actual control track by ½ ramp delay results in the actual control track and the actual reference being in phase.

The capstan servo circuitry programmable timer chip 704 (FIG. 19b) has a reference vertical input signal on line 730 which is applied to a tracking one-shot 732. During reproducing, the tracking one-shot is programmed to directly follow the reference vertical and apply a pulse on output line 734 which is applied to a counter divider 736 that in turn provides various output signals, such as a frame rate signal on line 738, a ½ frame rate signal on line 740, and a ¼ frame rate signal on line 742. During normal operation, the frame signals will be synchronized to reference vertical and is phase adjustable by operation of the control track phase control.

In accordance with an important aspect of the present invention, a very significant functionally desirable capability is possible by virtue of the programmable timer chip 704 and particularly the tracking one-shot 732 therein in that it can be reprogrammed to operate as a rate generator and provide an output that varies slightly relative to the input reference. Thus, the output signal on line 734 may be one count in 40,000 counts different relative to the reference vertical or any other difference can be programmed by the microprocessor so that a definite time compression or expansion of the reproduction can be obtained if desired. This would permit an entire program to be speeded up or slowed down to fit the time slot that is desired and it can be done without removing any particular segment of the program. All that needs to be done is to reprogram the tracking one-shot section of the timer chip 704 to provide a time difference that will result in either a time expansion or compression of the program and all of the program content will still be present during reproducing.

It should be appreciated that when a video tape is recorded on one apparatus and is played back on another, there is an interchange problem which can create time variations that are greatly in excess of the difference that may be programmed into the tracking one-shot. Therefore, to insure that the program will be actually expanded or compressed by the desired amount, it is necessary that the apparatus still maintain control track lock of the capstan servo. When such is done, then the rate generator operation from the tracking one-shot will effectively perform the time expansion or contraction that is programmed into the apparatus as is desired.

To accomplish the asynchronous playback that has been described, reference is made to FIG. 19b which has the reference vertical signal applied via input line 730 as previously described. During normal playback, the output of the one-shot 732 provides a delay time that is a function of a control track phase adjustment potentiometer which is located on the front panel of the apparatus and which is a part of the operator controlled machine control system. The output from the tracking one-shot 732 appears on line 734 to the divider 736 and the frame output on line 738 is used to control the up-/down line of the counter 726 shown in FIG. 19a. The value of the counter is latched into the digital-to-analog converter 724 by the control track playback frame pulse on line 722 which thereby generates a control track error voltage that appears at the output of the digital-to-analog converter 724 and which ultimately results in a signal at output line 326 that is one of the inputs to the analog-to-digital converter circuit 320 shown in FIG. 17b. The circuitry of FIG. 17b converts the analog value to an 8-bit word that is applied to the microprocessor 30 through the multiplexed analog-to-digital converter 320 shown in FIG. 17. The microprocessor converts the data to a 16-bit word which it applies to an inner loop reference counter 744 (FIG. 19b) which clocks a D flip-flop 746 that operates as a divide-by-two and provides the reference input signal on line 644 which closes the control track servo loop.

When the apparatus is operating in the asynchronous playback mode, the microprocessor 30 is programmed to write a high signal to a latch 748 which has an output line 750 that extends to gates 752 and 754 (FIG. 19b). The high signal on line 750 effectively disables the loading operations that would occur in the divider 736 and it additionally forces the input to the tracking one-shot 732 high to enable it to begin counting. The tracking one-shot is thereby changed to be a rate generator that produces an output vertical reference frequency that is programmable by the microprocessor. Since the input to the counter 732 is the studio reference clock frequency, the output can be programmed to be different from the normal reference vertical by the expression $$\frac{F \text{ input clock}}{\text{Normal count}} \pm \frac{F \text{ input clock}}{\text{Programmed count}}$$

The programmed count can be derived from a local or a remote source. It should be appreciated that since the tape will be moving at a speed that is slightly different from the normal record or reproduce speed to accomplish the desired time compression or expansion, the automatic scan tracking head will occasionally be required to make a track jump. For this reason, the automatic scan tracking servo and time base corrector operation is switched from normal play to variable play so that the desired track jumps can be carried out.

As has been previously described with the block diagram of the capstan servo shown in FIG. 8, the variable potentiometer 196 for controlling the slow motion reproducing of the apparatus provides an analog potentiometer signal which is converted into an 8-bit word that is applied to the microprocessor. The microprocessor 31 then processes the 8-bit data word to provide a nonlinear function for the purpose of accomplishing the desired feel of the apparatus in terms of the speed of response as a function of the amount of arcuate movement of the potentiometer which is also a function of the speed at which the capstan is being driven. This operation can be more readily appreciated from FIG. 27a which shows a transfer function of the speed versus the processed input data word from the potentiometer 196. As has been described with respect to FIG. 8, the microprocessor loads a 16-bit word into counter 164 via load lines 168 (which in actuality is the data bus 31) which in FIG. 19b, comprises the inner loop reference counter 744 of the timer chip 704. By changing the 16-bit number that is applied to the counter, a different output value on line 162 is applied to the up/down counter 154 which effectively changes the speed of the capstan by virtue of the inner loop control.

Figure 27:
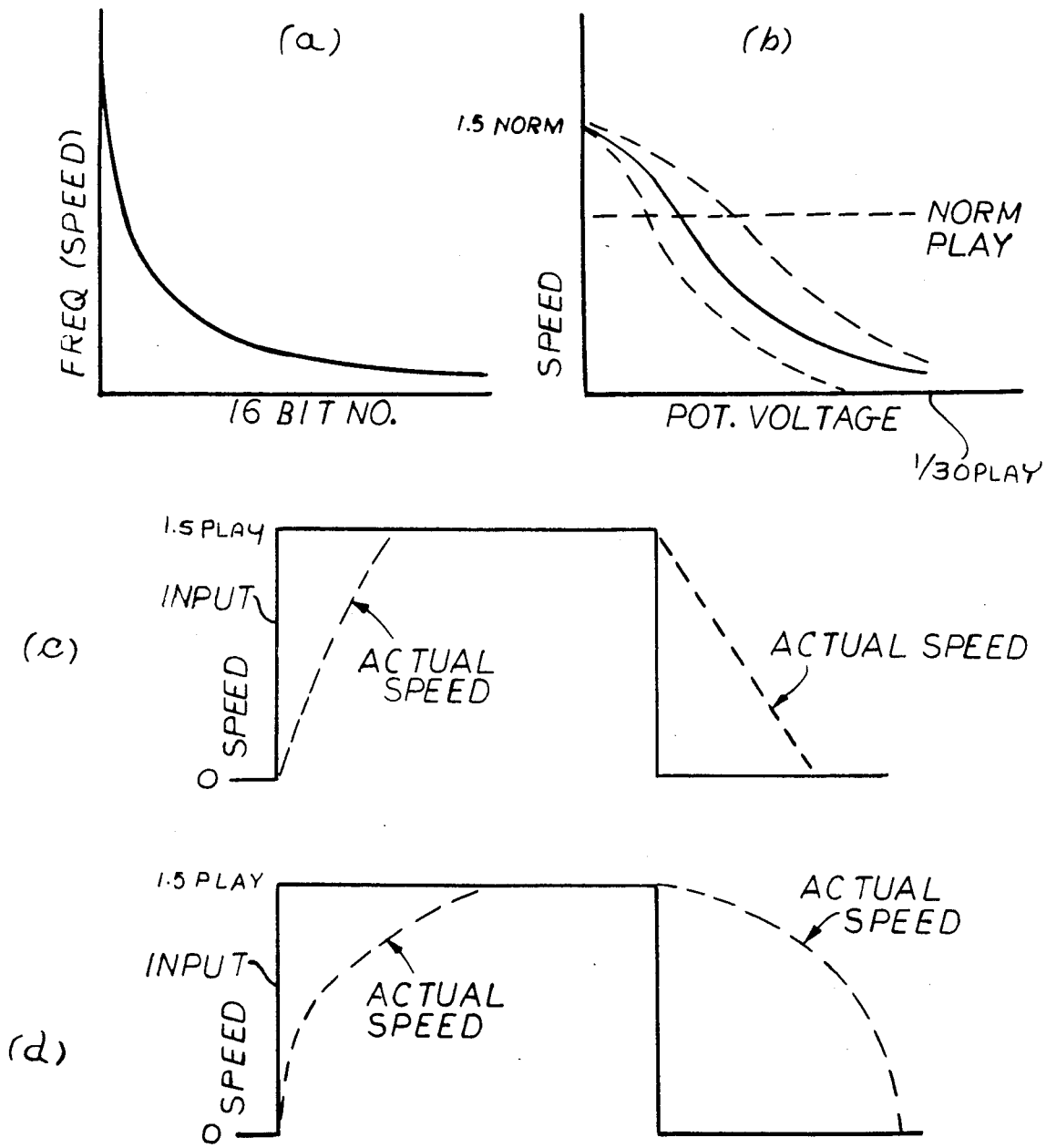

While the microprocessor receives an 8-bit word, it performs a multiplication function to obtain the 16-bit word which is applied to the counter 164. The result is the nonlinear transfer function as shown in FIG. 27a wherein the speed increases as the value of the 16-bit number decreases. The output speed is inversely proportional to the value of the number applied to the counter. The transfer function shown in FIG. 27a is undesirable for the reason that it does not provide the desirable feel to an operator for controlling the speed during the variable motion reproducing.

When the unit is operating at very slow speeds, a two unit angular change of the potentiometer may result in a one percent change in the reproducing speed and there therefore is no significant stepped speed change involved in making the two unit anngular change of the potentiometer. However, when the apparatus is reproducing at higher speeds, i.e., close to normal reproducing speed or faster than normal speeds, a two unit angular change in the setting of the potentiometer may result in a 20 percent change in the output frequency which can make a very pronounced and stepped speed change in the image being viewed.

Accordingly, it is desired to change the shape of the transfer function in a manner shown in FIG. 27b and this is accomplished by further processing the 8-bit word beyond a mere multiplication. This is accomplished by multiplying the 8-bit word by the function $$K + \frac{(\text{8-bit word})^3}{255}.$$

This results in the representation shown by the solid line of FIG. 27b. The microprocessor also limits the minimum number that can be provided to the counter so as to limit the output speed at 1½ times the normal reproducing speed. The curve of FIG. 27b then is shaped to provide smaller increments of actual speed change per unit change of the position of the potentiometer until it reduces to below normal play speed whereupon changes of values of the potentiometer more rapidly change the speed in the slower speeds. The dotted representations on each side of the solid representation show possible variations in the function that can be accomplished by varying the expression. The number 255 diviser of the function is intended to maintain the 16-bit word within the limits of zero and 64,000, the range of the 16-bit counter. If the ultimate multiplication result was greater than 64,000, then a discontinuity in the curve could result which would be extremely undesirable.

In accordance with another aspect of the nonlinearization of the slow motion variable potentiometer control, the viewer is much more able to observe the visual effects of the rate of change of the variable motion image at high speeds than at low speeds. Stated in other words, at very slow slow motion speeds, for example, in the range of 1/30 to 1/15 of normal speed, changes between one speed and another can be done rapidly without providing any disturbing visual effect to an observer. However, at high speeds, e.g., a change of from normal to 1½ times normal speed cannot be done rapidly without providing a significant disturbing effect on a viewer. Therefore, it is desirable to make changes between speeds at high speed more slowly than is done during changes at slow slow motion speeds. Such variation is also accomplished by the apparatus of the present invention and this is illustrated by FIGS. 27c and 27d. In FIG. 27c, an instantaneous change in the potentiometer from zero to 1½ times the normal play speed, e.g., the input line shown by the solid representation of FIG. 27c results in an actual response time to accomplish the speed change that is shown by the dotted representation. Similarly, if the speed is instantaneously changed from 1½ times play speed down to zero as shown in the right of FIG. 27c, the actual speed will ramp down as shown by that dotted representation.

The present apparatus desirably varies the response, effectively delaying it when the speed is operating close to normal speed and above. This is accomplished by inserting a time delay into the response wherein the amount of delay provided is a function of the actual speed that the tape is moving. The speed that is required dictates a certain 16-bit number that is applied to the counter 164 and this number is compared with the actual speed in order to increment or decrement the count that is to be applied to the counter. If the actual speed is one that is in the range of the normal playback speed or faster, then an increased time delay will be provided in reaching the required number so that the rate of change of speed will be decreased as the actual speed is increased. This is shown in FIG. 27d wherein the actual speed response to an instantaneous change from zero to 1½ times play shows a response that rises rapidly, i.e., very little delay in the early portion thereof and then increased amounts of delay are inserted so that the rate of change of speed is decreased as the actual speed increases. When the speed is instantaneously changed from 1½ times normal to zero, the actual speed change is delayed to change more slowly from the higher speeds and changes more rapidly at the slower speeds.

The Tape Sync Processing and Time Base Corrector Interface Circuitry

Although the various servo systems that are shown and described herein are primarily intended for use with a helical wrap recording and reproducing apparatus, the system could also be used for other types of recording and reproducing apparatus. The helical wrap recording and reproducing apparatus applies tracks to a tape during recording which are at an inclined angle relative to the longitudinal direction of the tape. Since the apparatus may preferably record a full field of information for each revolution of the scanning drum, each track will have a field of video information thereon, which for a NTSC format system will include 262½ lines of video information and for a PAL or SECAM FORMAT, 312½ lines of video information. The helical apparatus is also preferably equipped with automatic scan tracking as previously described, wherein the transducing head is attached to the end of an elongated movable element which can be moved transversely relative to the longitudinal direction of the tracks to thereby accurately follow a track or jump from one track to another during special effects reproducing.

The jumping from one track to another necessarily affects the relative timing of the video information, including the timing of the vertical and horizontal sync signals. For a NTSC system, the jumping from one track to an adjacent track will either advance or retard the relative timing by approximately 2½ lines (3½ lines for a PAL or SECAM format signal). The timing change would cause the image that is seen on a video monitor to vertically jump were it not for compensation that is applied to the signal by time base corrector circuitry in accordance with instructions issued by tape sync processing and time base corrector interface circuitry.

Figure 24A:
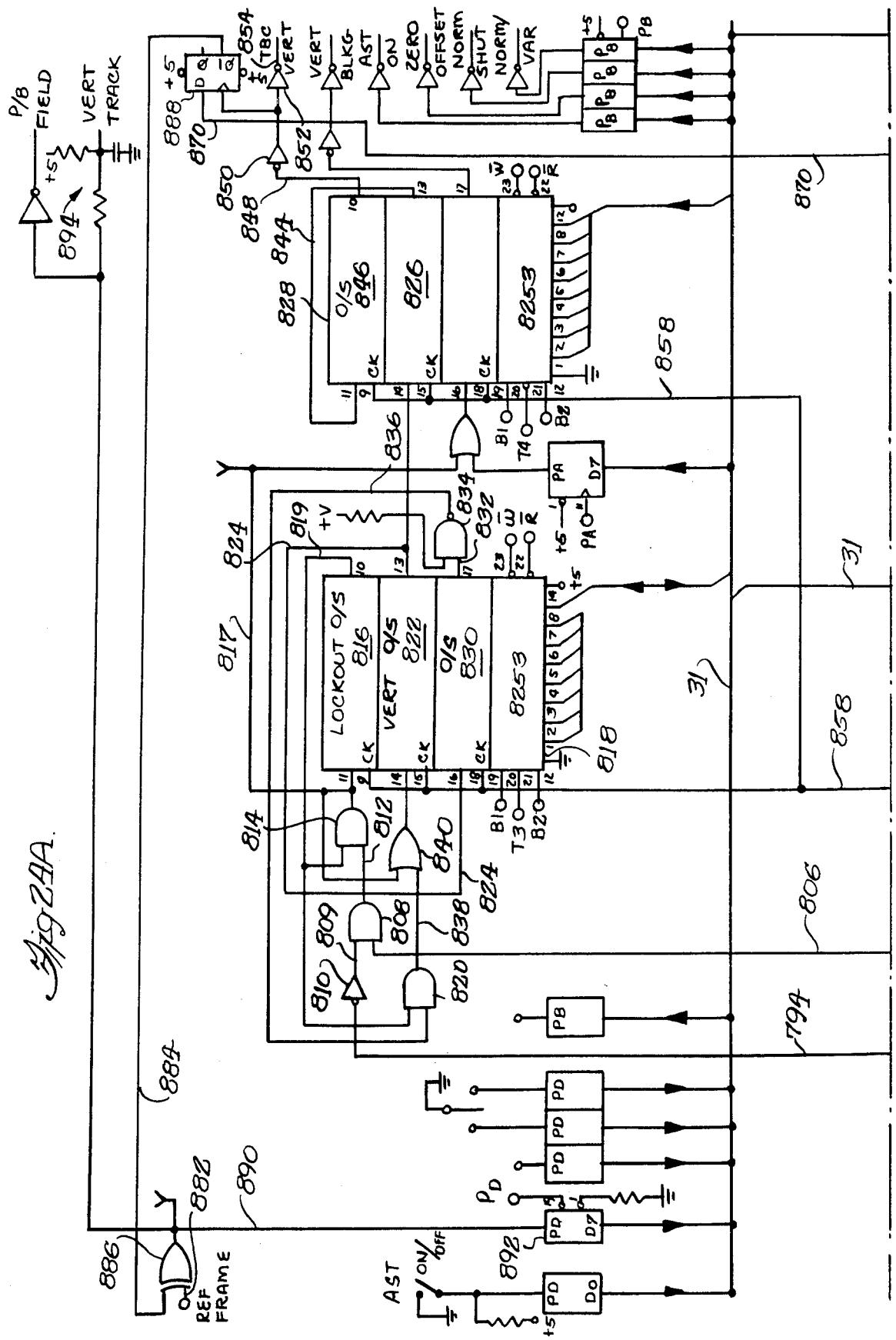
FIGS. 24a and 24b together form a detailed electrical schematic diagram of the tape sync processor and time base corrector interface circuitry of the apparatus embodying the present invention.
Figure 24B:
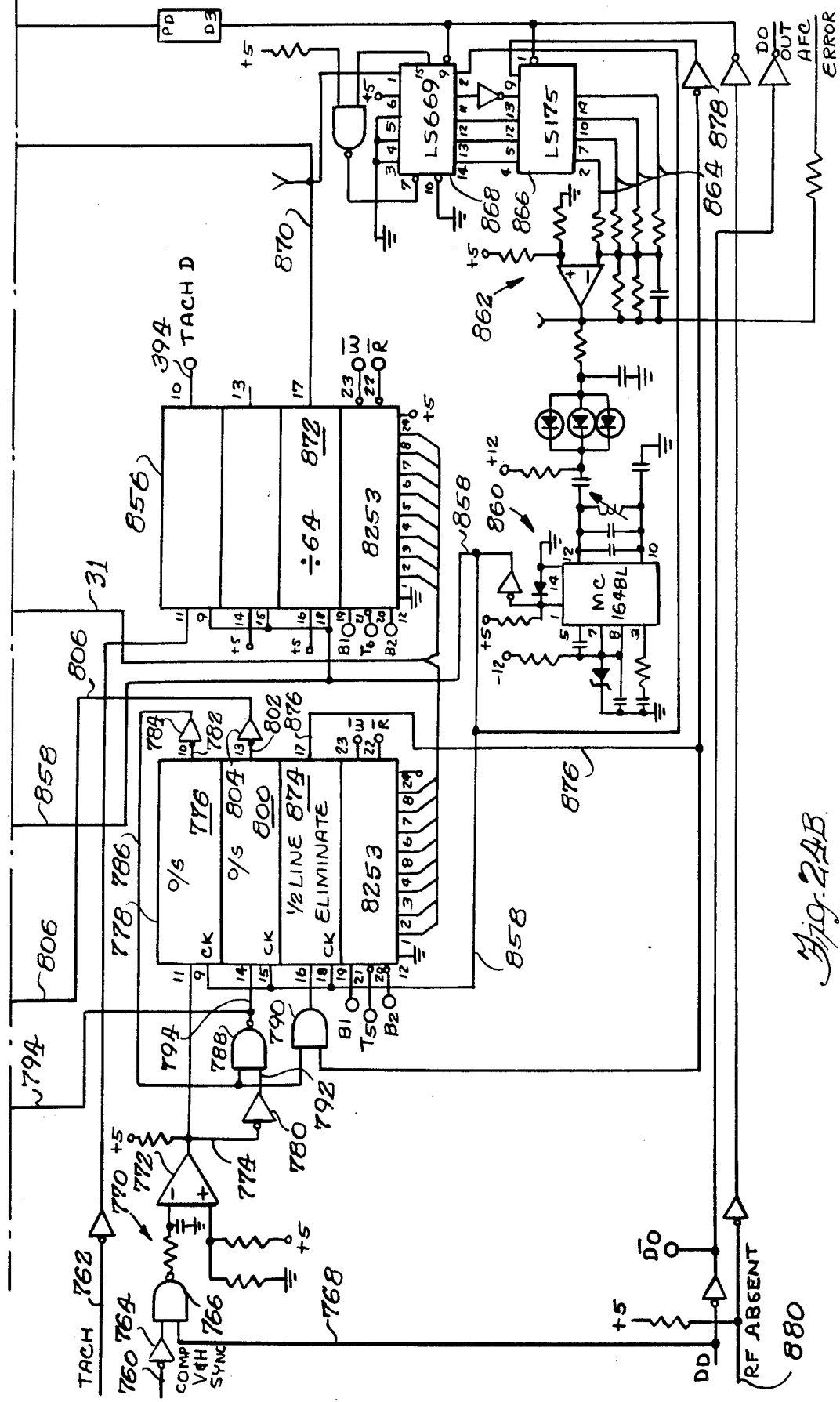

The circuitry that provides time compensation instructions is shown in FIGS. 24a and 24b and is defined as the tape sync processing circuitry which has a composite sync off tape input signal applied thereto on line 760 (FIG. 24B), together with a tachometer signal 762 that is indicative of the tape speed. Utilizing this information, the tape sync processor provides a time base predicted vertical signal to the time base corrector which is time adjusted to provide the requisite compensation as a function of the direction of a head jump that is to be performed, as well as whether a jump had occurred in the prior revolution in a particular direction. It should be appreciated that a jump in one direction may advance the timing of the vertical sync whereas a jump in the opposite direction would necessarily retard the timing of the vertical sync. Since any change in the timing that occurred during the previous revolution would have affected the timing, the history of the previous revolution is necessary to accomplish the necessary compensation of the timing for an intended jump and this history must necessarily include information concerning whether a jump occurred at all, and if such did occur, which direction it occurred.

The tape sync processor is under microprocessor control and it detects the second equalizing pulse in each vertical interval. The microprocessor uses the second equalizing pulse as a timing base for making timing adjustments. The second equalizing pulse is chosen because it is the earliest consistently available timing information during the vertical interval upon which to make a reliable detection for providing the timing information necessary to predict adjustments to the location of the time base corrector vertical signal. The second equalizing pulse is detected every revolution and by virtue of the history of the prior revolution and compensating timing changes that were made, through software control, calculates the necessary predicted changes for the present revolution depending upon whether a jump is to occur in whichever direction. Moreover, by virtue of the fact that the basic clock for the tape sync processor circuitry is a multiple of the off tape horizontal sync, it is directly proportional to the tape speed and this clock is therefore accurate so that a constant number of counts in a counter can be used to provide the compensation of the time base corrector vertical sync that is provided to the time base corrector. This constant number of counts will be added or subtracted from the time of a one-shot counter that is controlled by the microprocessor and the compensation will be accurately predicted to place both the time base corrector vertical signal and regenerated equalizer pulse at the proper location to maintain a stable picture during reproducing.

Figure 25:
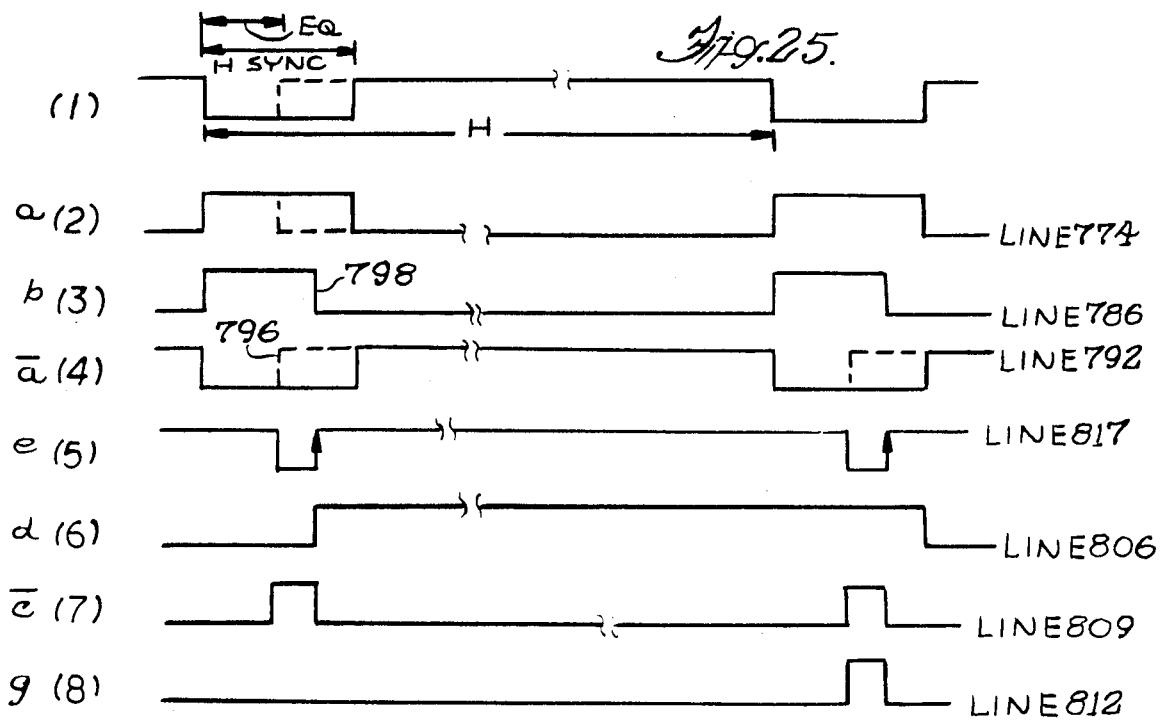
FIG. 25 illustrates timing diagrams which are useful in understanding the operation of the tape sync processor shown in FIG. 22.

Turning again to FIGS. 14a and 24b, the composite sync from the reproduced signal is applied to input line 760 (FIG. 24B) which is inverted by inverter 764 and applied to a NAND gate 766 that is disabled by a drop-out signal on line 768 if a drop-out signal is provided by drop-out detecting circuitry (not shown). The output of the NAND gate 766 is applied to a low pass filter 770 comprised of a resistor and capacitor and is then applied to the input of a slicer operational amplifier 772. The input signal goes high at the leading edge of vertical sync and this appears on output line 774 that is applied to a one-shot multivibrator 776 of a programmable timer chip 778 as well as to an inverter 780. The signal on line 774 illustrated by the timing diagram of FIG. 25(1) and the inversion of FIG. 25(1) is shown in FIG. 25(2). The dotted representation shown in FIG. 25(2) represents the shorter equalization pulse which is approximately ½ the duration of the horizontal sync pulse shown by the solid representation. The horizontal sync pulse shown in FIG. 25(2) has its leading edge applied to input of the one-shot 776 and fires the same. The duration of the one-shot output on line 782 is longer than the equalization pulse and shorter than the sync pulse and this signal is shown in FIG. 25(3). Its output is inverted by inverter 784. Output line 786 is applied to one input of a NAND gate 788 as well as to one input of an AND gate 790. Since the signal on line 786 (FIG. 25(3)) and the output signal of inverter 780 on input line 792 will cause the output of NAND gate 788 to go low when both inputs are high, the output line 794 of NAND gate 788 will be provided with a negative followed by a positive-going transition only when an equalizing pulse is present shown by FIG. 25(5). As shown in FIG. 25(4), a horizontal sync pulse is low during the time in which line 786 (FIG. 25(3)) is high.

Since the inversion of the equalizing pulse shown in FIG. 25(4) goes high (point 796 in FIG. 25(4)) prior to the completion of the high pulse (point 798 in FIG. 25(3)) shown in FIG. 25(3), an active low signal is produced only during the occurrence of the equalizing pulses as shown in FIG. 25(5). The active signal from the NAND gate 788 triggers a one-shot 800 whose output appears on line 802 and this is inverted by inverter 804 to provide a signal on line 806 which is shown in FIG. 25(6). The signal on line 806 is applied to one input of an AND gate 808 (FIG. 24A), the other input of which is provided by the NAND gate 788 (FIG. 24B) via line 794 and inverter 810 and line 809. The output signal of inverter 810 is shown in FIG. 25(7).

Figure 26:
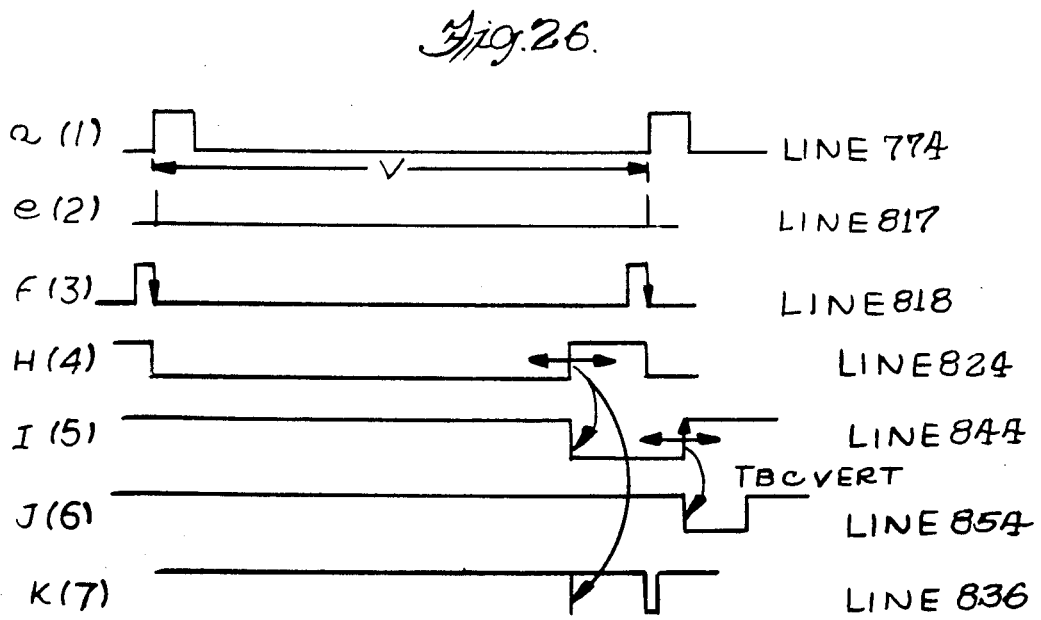
FIG. 26 illustrates timing diagrams which are useful in understanding the operation of the time base corrector interface circuitry shown in FIG. 24; and, FIG. 27, (a)–(d), illustrates several graphs of the transfer function for the capstan servo, particularly illustrating the nonlinear transfer function of the variable speed potentiometer control and the resulting capstan speed.

Because these two inputs both satisfy AND gate 808 only during the second equalizing pulse, AND gate 808 provides a true output on line 812 at the occurrence of the second equalizing pulse as is desired. The second equalizing pulse is applied to one input of AND gate 814 which has its output connected to a lock out one-shot 816 of another programmable timer chip 818. The output of the one-shot 816 appears on line 819 which is applied to the other input of AND gate 814 as well as to one input of a second AND gate 820. An active output line 819 locks out the remainder of the vertical interval after the occurrence of the second equalizing pulse. The waveforms of the signals from AND gates 808, AND gate 814 and one-shot 816 are illustrated in FIGS. 26(1), 26(2) and 26(3), respectively. The output of a vertical one-shot 822 on line 824 is applied to the input of one-shot 826 of a timer chip 828 in addition to being applied to the input of a one-shot 830. One-shot 830 has output line 832 applied to a NAND gate 834 and the output of NAND gate 834 provides a signal on line 836 to AND gate 820 which effectively provides a self-regenerating input signal to one-shot 822 via line 838 and OR gate 840. Therefore, if the signal is lost, a vertical rate signal will continue to be produced by virtue of one-shots 822 and 830.

The output of one-shot 822 is shown in FIG. 26(4) and is shown to have its trailing edge programmably adjustable in accordance with the history of the prior revolution as has been previously described. Once the trailing edge upward transition occurs, it triggers the one-shot 826 which is also adjustable depending upon whether the previous revolution contained a jump in whatever direction. Output line 844 is applied to a one-shot 846 of constant duration and its output appears on line 848 that is applied via inverters 850 and 852 to provide the time base corrector vertical signal on line 854 to the time base corrector and this signal is shown in the waveform of FIG. 26(6).

As is apparent from viewing FIGS. 26(4), 26(5) and 26(6), the position of the time base corrector vertical pulse is a function of the addition of the duration of the period of the one-shot 822 that produces the waveform shown in FIG. 26(4) and the duration of the one-shot 826 that produces the waveform shown in FIG. 26(5). It is the upward transition at the completion of the period of one-shot 826 that triggers one-shot 846 and produces the time base corrector vertical signal. Since the timer chips and particularly one-shots 822 and 826 are under program control and the microprocessor has stored in it the history of the activity that occurred in the prior head revolution, i.e., whether a jump occurred and in which direction it occurred, the microprocessor can change the count in the one-shots to provide the proper compensation so as to place the time base corrector vertical pulse in the proper location. Similarly, the one-shots 822 and 830 are differently program controlled by the microprocessor to provide a predicted second equalizer pulse on line 838 which is automatically inserted in the absence of tape equalizing pulses. The computer listings contain the information which accomplishes the compensation in accordance with the history of the prior revolution in terms of the presence or absence of a jump as well as the instantaneous level or position of the head and whether a jump is to occur in the present revolution. If a jump is to occur, then the proper compensation of the time base corrector vertical pulse is made to insure that the picture will be vertically stable during reproducing.

The timer chips 778, 818, 828 and a timer chip 856 are all clocked by a clock line 858 that originates from a voltage controlled oscillator 860 (FIG. 24B) which is controlled by the output of a digital-to-analog converter 862 which is connected to output lines 864 of a latch 866. Latch 866 is a part of a digital sample and hold circuit that includes an up/down counter 868 whose up/down control line is controlled by output line 870 of a divide by 64 divider 872 and its input is a 64 times the horizontal rate which is the output frequency of the voltage controlled oscillator 860. The counter 868 is clocked by clock line 858.

A ½ line eliminator 874 provides an output on line 876 that is at the horizontal rate and is derived from the off-tape composite sync signal. The horizontal rate signal on line 876 is inverted by inverter 878 and controls the latch 866 so as to write in the error that is present in up/down counter 868 at the latch time. In the event that the off-tape signal is lost, an RF absent signal is applied to line 880 which is operably connected to the counter 868 and latch 866 via two inverters. The effect of an active RF absence signal will cause the counter 868 to indicate zero error which will be transmitted through latch 866 to force zero error onto the output of the digital-to-analog converter 862 so that the voltage controlled oscillator 860 will be free-running at the 64H clock rate.

To determine whether the apparatus has the correct field match during playback, the apparatus compares the reference frame signal on line 882 (FIG. 24A) with the playback frame signal on line 884, both lines of which provide inputs to an EXCLUSIVE OR gate 886. The playback frame signal originates from the time base corrector vertical and horizontal signals which are applied to a D flip-flop 888. The D input is provided by the horizontal signal from line 870 of the 872 counter (FIG. 24A) and the time base corrector vertical signal from the output of inverter 850 clocks the D flip-flop and provides the playback frame rate signal on the Q̄ output line 884 which is applied to the EXCLUSIVE OR gate 886. When both inputs to the EXCLUSIVE OR gate are high, then its output line 890 is low and, correspondingly, if both inputs are low, the output line is also low. When the inputs have different levels, the EXCLUSIVE OR output level will be high. The output signal on line 890 is sampled by the microprocessor via a tri-state buffer 892 during the mid-portion of the frame period to determine if the playback signal is properly frame matched relative to the reference signal. If the frame match is incorrect, then the microprocessor will command the automatic scan tracking servo to provide a one track head jump and the jump will be in the direction toward the center or nominal undeflected position of the piezo-ceramic bimorph that carries the head. The output line 890 also extends to an integrator 894 which integrates the signal level over a number of fields and provides an analog signal which is utilized by the recorder during edits to assist in proper editing. The microprocessor also averages the value of the output of the EXCLUSIVE OR gate 886 over several consecutive fields for the purpose of insuring that the frame match signal is accurate, and if so, it will command a jump if necessary.

The Reference Clock Generator Circuitry

In accordance with another aspect of the present invention, the reference generator shown in FIG. 22 is operable to provide various reference clocks for use in the circuitry of the apparatus and is adapted to operate in two modes, one of which is synchronous with composite station synchronization signals to provide various synchronous reference clock signals, namely frame rate signals, vertical reference synchronization signals and various multiples of the horizontal sync signal. Since the reference generator is synchronized to station composite sync, and provides the clock signals for the entire apparatus, the clock signals are thereby fully synchronized throughout all circuitry of the apparatus described herein. The reference generator is also adapted to operate in a free-wheeling mode in the sense that if composite sync is lost, the various clocks will be produced by the reference generator circuitry in a manner that has the requisite stability to insure proper operation of the apparatus in the absence of composite sync. The reference generator is phase locked to the composite sync under the control of the microprocessor 31 and is thereby adapted to be configured to either a 525 line NTSC format or a 625 horizontal line PAL or SECAM format.

Turning specifically to FIG. 22, reference composite sync is applied to line 900 and is inverted by inverter 902, the output of which appears on line 904 that is connected to the cathode of a diode 906, the anode of which is connected to the negative input of comparator 908 as well as to a capacitor 910 and a source of positive voltage through resistor 912. The comparator 908 effectively separates the horizontal sync pulses from the vertical sync pulses and provides a low output at the appearance of the first broad pulse of the vertical sync sequence. This is inverted by inverter 914 and applied to an AND gate 916 which has its output connected to the input of a one-shot 918 of a programmable timer chip 920 that is reset shortly before the occurrence of the next vertical interval. Thus, the operation of the one-shot is effective to be triggered at the occurrence of the first broad pulse during the vertical synchronization sequence and output line 922 goes low at a vertical rate and the low pulse disables gate 916 so that subsequent broad pulses of the vertical synchronization interval will not trigger the one-shot 918 again. The output is also connected to a sychronized counter 924 and to a retriggerable one-shot 926. The synchronized counter provides a vertical pulse on output 928 which clocks a D flip-flop 930 and via gates 932 and 934 provides a vertical reference signal on line 936 which is inverted by inverter 938 and the inverted signal appears on output line 940.

As long as reference composite sync is present at the input 900, reference vertical will be provided on output line 940 that is synchronized to the reference composite sync as is desired. In the event that reference composite sync is interrupted for some reason, then the retriggerable one-shot 926 will time out. In this regard, it has a time constant that is substantially longer than a normal switching operation that would occur during an edit, for example. If the retriggerable one-shot 926 is not provided with subsequent input pulses via line 922, then it will provide a low signal on output line 942 which will set flip-flop 930 so that the reference vertical on line 940 will be provided by the synchronized counter output 928 rather than the detected vertical pulse output from the one-shot 918. The synchronized counter 924 is programmed from the data bus 31 and is provided with a counter value that is consistent with the period of the vertical sync and the synchronized counter will provide vertical sync pulses on output line 928 by virtue of the internal counter rather than being retriggered by virtue of the detection of the vertical sync component of the reference composite sync.

The reference composite sync on line 900, after undergoing an inversion, is then applied to two gates 944 and 946 which, together with the associated resistor and capacitor, form a very narrow pulse on output line 948 which is applied to one input of AND gate 950, the output of which is applied to a ½ line eliminator counter 952 of a programmable timer chip 954 via line 956. The output of the ½ line eliminator appears on line 958 which is applied to the other input of AND gate 950, and line 956 thereby contains a 1H frequency rate pulse that is essentially the input reference horizontal signal which is applied to the clock input of a latch 960 which effectively latches in the input value applied from an up/down counter 962 at the time the input reference horizontal signal occurs.

A voltage controlled oscillator 964 has an output line 966 which is inverted by inverter 968 and provides a 4 MHz output on line 970 which extends to a divide-by-two circuit 972 as well as to the clock inputs of the up/down counter 962. The divided 2 MHz clock on line 974 is applied to clock the one-shot 918 as well as synchronized counter 924 and is also applied to a counter 976 which operates as a divide-by-four counter and provides a 32H rate signal on output line 978 which in turn is applied to a divider 980 which has various output clock signals, i.e., 16H, 8H, 4H and 2H, as shown. The divider 980 also has a 2H rate output 982 which is applied to a divide-by-two divider 984 which provides a H rate signal on line 986 that clocks the retriggerable one-shot 926 and also controls the up/down control line to the up/down counter 962. The up/down counter together with the latch 960 form a digital sample and hold circuit. The up/down counter 962 is clocked by the 4 MHz clock signal on line 970 and operates to provide a digitial representation of the H rate signal, since it is either at the upper or lower level or is changing from one of the levels to the other when the instantaneous value is latched into the latch 960 at the occurrence of the reference horizontal via line 956. The latch 960 has output lines which are applied to a resistor ladder network and an operational amplifier which function as a digital-to-analog converter 988, the output of which is applied to a varicap diode 990 that controls the voltage controlled oscillator 964 to thereby phase synchronize the voltage controlled oscillator to the reference composite sync as is desired.

In the event that the reference composite sync is missing as previously described, then the retriggerable one-shot 926 causes the D flip-flop 930 to provide a low signal on line 992 which is applied to the up/down counter 962 as well as the latch 960. The low signal on line 992 sets the up/down counter 962 to provide zero error and simultaneously causes the latch 960 to be transparent so that zero error is forced from latch 960 which provides zero error to the varicap 990 and enables the voltage controlled oscillator 964 to operate in a free-wheeling manner since there is no reference composite sync upon which the system can be synchronized.

Conclusion

From the foregoing description, it should be appreciated that a microprocessor controlled multiple servo system has been shown and described which, by virtue of its powerful capabilites, enables asynchronous playback to be easily accomplished merely by changing a counter value in the capstan servo to eliminate synchronism of the capstan from station reference while maintaining control track lock. The apparatus simultaneously places the automatic scan tracking servo in the automatic operating mode so that track jumps can occasionally occur as needed, which will vary in accordance with the amount of time compression or expansion that is being performed.

It should be understood that although preferred embodiments of the present invention have been illustrated and described, various modifications thereof will become apparent to those skilled in the art; and, accordingly, the scope of the present invention should be defined only by the appended claims and equivalents thereof.

Various features of the invention are set forth in the following claims.

What is claimed is:

1. A servo system for controlling a magnetic tape recording and reproducing apparatus to permit asynchronous reproducing to selectively enable reproducing time compression and expansion relative to the normal speed reproducing time, said system comprising:
    a tape transport servo for moving the tape during reproducing, said servo being capable of detecting recorded control track signals and including a programmable counting means for providing a reference output signal for synchronization with the detected control track signals during tape transport to cause the tape to be transported at a normal play speed, said counting means having an input terminal for receiving a reference input signal which triggers said counting means, the counting means providing an output signal which is synchronized to the reference input signal when the counting means is triggered thereby;
    processing means for controlling the tape transport servo means to override the reference input signal and for programming said counting means with a preselected count so that said counter provides an alternate reference output signal, which alternate reference output signal is delayed or advanced relative to the reference input signal.

2. A servo system as defined in claim 1 wherein said counter output signal is delayed or advanced relative to said reference input signal by an amount that is proportional to the amount of time compression that is desired.

3. The servo system of claim 1 wherein said reference input signal is a vertical synchronization signal.

4. Apparatus for controlling the operation of a recording and reproducing apparatus, comprising:

a servo for moving the tape during reproducing, said servo being capable of detecting recorded control track signals on the recorded tape and moving the tape so that the control track signals are synchronized with a vertical sync signal, said servo including a programmable counting means having an output for providing said vertical sync signal, said counting means operating in a first mode wherein said output signal is synchronized to a reference vertical sync signal that is applied to said programmable counting means, and a second mode wherein the counting means output vertical sync signal is at a rate other than the rate of said reference vertical sync signal said counting means being operable as a free-running counter in such event, with the rate of the output signal being determined by a count that is programmed therein;

processing means for providing a count number to said programmable counting means and for controlling the mode of operation of said counting means to regulate the frequency of its output signal and thereby selectively expand or compress the speed of reproducing while maintaining contol track synchronization.

5. In a tape transport servo system for a magnetic tape reproducing apparatus of the type in which the longitudinal tape speed is regulated to synchronize a control signal recorded on the tape with a reference signal, apparatus for enabling the reproduction of video information to be selectively expanded or compressed relative to a standard rate of reproduction, comprising:

a programmable counter that receives an input signal having a frequency related to the speed of the tape during said standard rate of reproduction, and that produces said reference signal, said reference signal being delayed relative to said input signal by an amount corresponding to a predetermined number programmed therein; and means for inhibiting the responsiveness of said counter to said input signal and for programming said counter to produce a reference signal that is at a frequency other than the frequency of said input signal.

6. The apparatus of claim 5 further including means for producing a pulsed clock signal and applying the signal to said counter to cause said counter to count the pulses therein, said counter being responsive to said input signal to begin counting said clock pulses and to produce said reference signal when the number of counted pulses equals said predetermined number, and being responsive to said inhibiting means to continuously count said clock pulses and produce said reference signal each time the number of counted pulses equals a number programmed into said counter by said inhibiting means.

7. The apparatus of claim 6 wherein said inhibiting means includes a programmed microprocessor.

* * * * *

UNITED STATES PATENT AND TRADEMARK OFFICE
CERTIFICATE OF CORRECTION

PATENT NO.   :   4,635,138

DATED        :   January 6, 1987

INVENTOR(S)  :   Kenneth Louth

It is certified that error appears in the above-identified patent and that said Letters Patent is hereby corrected as shown below:

```
Column  1, line 15, delete "22", insert --27--;
Column  4, line 67, delete "20", insert --30--;
Column 10, line 51, delete "/leg", insert --/lag--;
Column 12, line  7, delete "a" (seconc occurrence);
           line 27, delete "fromthe", insert --from the--;
           line 50, delete "hereinfter", insert --hereinafter--;
Column 13, line 37, delete "no", insert --an--;
Column 15, line 17, delete "of FIG. 5", insert --diagrams--;
Column 16, line 58, delete "decorders", insert --decoders--;
Column 17, line 18, delete "he", insert --the--;
           line 22, delete "oppoistely", insert --oppositely--;
           line 23, delete "toegether", insert --together--;
Column 19, line 38, delete "comprehehsively", insert
                    --comprehensively--;
Column 21, line 14, delete "one", insert --once--;
Column 24, line  3, delete "apropriately", insert --appropriately--;
           line 46, delete "knowns", insert --knows--;
Column 30, line 51, delete "196", insert --19b--;
Column 33, line 57, delete "196", insert --19b--;
Column 34, line 61, delete "anngular", insert --angular--;
Column 37, line 34, delete "14a", insert --24a--;
Column 42, line 64, after "compression", insert --and
                    expansion--.
```

Signed and Sealed this

Thirteenth Day of December, 1988

*Attest:*

DONALD J. QUIGG

*Attesting Officer*    *Commissioner of Patents and Trademarks*